(12) United States Patent
Ohshima

(10) Patent No.: US 10,625,734 B2
(45) Date of Patent: Apr. 21, 2020

(54) AUTOMATIC DRIVING SYSTEM FOR AUTOMATICALLY DRIVEN VEHICLE

(71) Applicant: DENSO CORPORATION, Kariya, Aichi-pref. (JP)

(72) Inventor: Hiroaki Ohshima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 241 days.

(21) Appl. No.: 15/887,129

(22) Filed: Feb. 2, 2018

(65) Prior Publication Data

US 2018/0170367 A1 Jun. 21, 2018

Related U.S. Application Data

(63) Continuation of application No. 14/951,139, filed on Nov. 24, 2015, now Pat. No. 10,005,458.

(30) Foreign Application Priority Data

Nov. 26, 2014 (JP) .................................. 2014-238979

(51) Int. Cl.
*B60W 30/06* (2006.01)
*G05D 1/00* (2006.01)
(Continued)

(52) U.S. Cl.
CPC ............ *B60W 30/06* (2013.01); *G05D 1/0061* (2013.01); *G08G 1/04* (2013.01); *G08G 1/056* (2013.01); *G08G 1/144* (2013.01); *G08G 1/146* (2013.01); *G08G 1/207* (2013.01); *B60W 2550/22* (2013.01); *B60W 2710/30* (2013.01); *B60W 2900/00* (2013.01); *G05D 1/0088* (2013.01); *G05D 2201/0213* (2013.01)

(58) Field of Classification Search
CPC ............ B60W 30/06; B60W 2550/22; B60W 2710/30; B60W 2900/00; G05D 1/0061; G05D 1/0088; G05D 2201/0213; G08G 1/04; G08G 1/056; G08G 1/144; G08G 1/146; G08G 1/207
See application file for complete search history.

(56) References Cited

U.S. PATENT DOCUMENTS

| 5,229,941 A | 7/1993 | Hattori |
| 5,448,479 A | 9/1995 | Kemner et al. |

(Continued)

FOREIGN PATENT DOCUMENTS

| JP | H10-334391 | 12/1998 |
| JP | 2001-256598 | 9/2001 |

(Continued)

*Primary Examiner* — Calvin Cheung
(74) *Attorney, Agent, or Firm* — Knobbe, Martens, Olson & Bear, LLP

(57) ABSTRACT

An automatic driving system for an automatically driven vehicle. In the system, a travel direction acquirer is configured to acquire travel direction information that is information indicative of whether or not each of lanes in a parking lot is unidirectional. In addition, in the system, an allowance determination unit is configured to, if determining, based on the travel direction information acquired by the travel direction acquirer, that each of the lanes in the parking lot is unidirectional, allow automatic driving of the automatically driven vehicle.

20 Claims, 17 Drawing Sheets

(51) Int. Cl.
*G08G 1/14* (2006.01)
*G08G 1/04* (2006.01)
*G08G 1/056* (2006.01)
*G08G 1/00* (2006.01)

(56) References Cited

U.S. PATENT DOCUMENTS

| | | |
|---|---|---|
| 5,469,676 A | 11/1995 | Colsman |
| 8,527,199 B1 | 9/2013 | Burnette |
| 8,712,624 B1 | 4/2014 | Ferguson |
| 8,948,501 B1 | 2/2015 | Kim |
| 9,547,986 B1 | 1/2017 | Curlander |
| 9,557,741 B1 | 1/2017 | Elie |
| 9,567,007 B2 | 2/2017 | Cudak |
| 9,702,098 B1* | 7/2017 | King ................... E01F 9/40 |
| 2001/0020902 A1 | 9/2001 | Tamura |
| 2005/0002558 A1 | 1/2005 | Franke |
| 2008/0461741 | 2/2008 | Johnson |
| 2009/0192683 A1 | 7/2009 | Kondou |
| 2009/0259365 A1 | 10/2009 | Rohlfs |
| 2010/0246889 A1* | 9/2010 | Nara ............... G06K 9/00798 382/104 |
| 2010/0274430 A1 | 10/2010 | Dolgov |
| 2012/0188100 A1 | 7/2012 | Min |
| 2014/0149153 A1 | 5/2014 | Cassandras |
| 2014/0210646 A1 | 7/2014 | Subramanya |
| 2014/0218527 A1 | 8/2014 | Subramanya |
| 2014/0236686 A1 | 8/2014 | Grush |
| 2014/0257943 A1* | 9/2014 | Nerayoff ............ G06T 7/292 705/13 |
| 2014/0278029 A1 | 9/2014 | Tonguz |
| 2014/0297182 A1 | 10/2014 | Casson |
| 2015/0033647 A1 | 2/2015 | Suhami |
| 2015/0120124 A1* | 4/2015 | Bartels ............... B60W 50/10 701/23 |
| 2015/0138001 A1 | 5/2015 | Davies |
| 2015/0153183 A1 | 6/2015 | Kadous |
| 2015/0203111 A1 | 7/2015 | Bonnet |
| 2015/0210274 A1 | 7/2015 | Clarke |
| 2015/0248131 A1 | 9/2015 | Fairfield |
| 2015/0345967 A1* | 12/2015 | Meuleau ........... G01C 21/3453 701/25 |
| 2016/0148514 A1* | 5/2016 | Iwami ................. G08G 1/168 340/932.2 |
| 2016/0178382 A1 | 6/2016 | Kojo |
| 2017/0010105 A1 | 1/2017 | Gdalyahu |
| 2017/0021828 A1 | 1/2017 | Seo |
| 2017/0046956 A1 | 2/2017 | Gaebler |
| 2017/0060133 A1 | 3/2017 | Seo |
| 2017/0212511 A1 | 7/2017 | Paiva Ferreira |

FOREIGN PATENT DOCUMENTS

| | | |
|---|---|---|
| JP | 2003-123185 | 4/2003 |
| JP | 2005-297817 | 10/2005 |
| JP | 2006-302187 | 11/2006 |
| JP | 2007-094542 | 4/2007 |
| JP | 2007-295033 | 11/2007 |
| JP | 2009-104531 | 5/2009 |
| JP | 2009-277059 | 11/2009 |
| JP | 2011-054116 | 3/2011 |
| JP | 2014-054901 | 3/2014 |
| JP | 2014-102750 | 6/2014 |
| JP | 2014-108711 | 6/2014 |
| JP | 2014-163105 | 9/2014 |
| WO | WO 2016/066354 | 5/2016 |

\* cited by examiner

AUTOMATIC DRIVING SYSTEM FOR AUTOMATICALLY DRIVEN VEHICLE

CROSS-REFERENCE TO RELATED APPLICATION

This application is a continuation application of U.S. application Ser. No. 14/951,139 filed on Nov. 24, 2015, and claims the benefit of priority from earlier Japanese Patent Application No. 2014-238979 filed on Nov. 26, 2014, the description of which is incorporated herein by reference.

BACKGROUND

Technical Field

The present invention relates to an automatic driving system for an automatically driven vehicle and particularly to a technique for enabling automatic driving of the automatically driven vehicle in a parking lot.

Related Art

Some techniques for automatically driving a vehicle have become increasingly practical. For example, in a known technique as disclosed in Japanese Patent Application Laid-Open Publication No. 2014-102750, a fixed station has a map stored therein of a controlled area where a vehicle is allowed to be driven automatically. The fixed station sequentially receives travel data from an automatic driving unit mounted in the vehicle. Based on the received travel data and the map of the controlled area, the fixed station keeps track of a location of the vehicle carrying the automatic driving unit and directs the vehicle to a target location in the controlled area.

As with a manned vehicle, a driverless or automatically driven vehicle has to travel while avoiding other vehicles in an environment of the automatically driven vehicle. Without traffic rules, a vehicle could travel freely, but it would be difficult to avoid the other vehicles in the environment without more accurately monitoring the other vehicles in the environment and more accurately driving the vehicle as compared with in the presence of the traffic rules. For such a reason, various traffic rules have been enacted.

However, generally, a parking lot is a privately-owned area, to which the traffic rules are not applied. Thus, a vehicle traveling in the parking lot may be reckless. In addition, there may often be pedestrians in the lanes of the parking lot. A stationary object, such as baggage or an unattended cart, may often be placed in a lane of the parking lot. Therefore, driving in the parking lot necessitates more accurate driving while more accurately monitoring the environment of the vehicle as compared with driving on a highway.

Accordingly, when the automatically driven vehicle is automatically driven in the parking lot, the reliability of automatic driving tends to be reduced as compared with when the automatically driven vehicle is automatically driven on a highway.

In consideration of the foregoing, exemplary embodiments of the present invention are directed to providing an automatic driving system for an automatically driven vehicle, capable of increasing the reliability of automatic driving of the automatically driven vehicle in a parking lot.

SUMMARY

In accordance with an exemplary embodiment of the present invention, there is provided an automatic driving system for an automatically driven vehicle. The system includes: a travel direction acquirer configured to acquire travel direction information that is information indicative of whether or not each of lanes in a parking lot is unidirectional; and an allowance determination unit configured to, if determining, based on the travel direction information acquired by the travel direction acquirer, that each of the lanes in the parking lot is unidirectional, allow automatic driving of the automatically driven vehicle.

The above automatic driving system is configured to, if determining that each of the lanes in the parking lot is unidirectional, allow automatic driving of the automatically driven vehicle. With this configuration, when each of the lanes in the parking lot is unidirectional, the likelihood that the automatically driven vehicle and another vehicle face each other in the same lane during automatic driving is low as compared with when some of the lanes in the parking lot are bidirectional or have indefinite travel directions. Therefore, the need for a complex automatic driving control, such as backward movement, may be reduced. This can enhance the reliability of automatic driving in the parking lot.

DESCRIPTION OF SPECIFIC EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

First Embodiment

Figure 1:
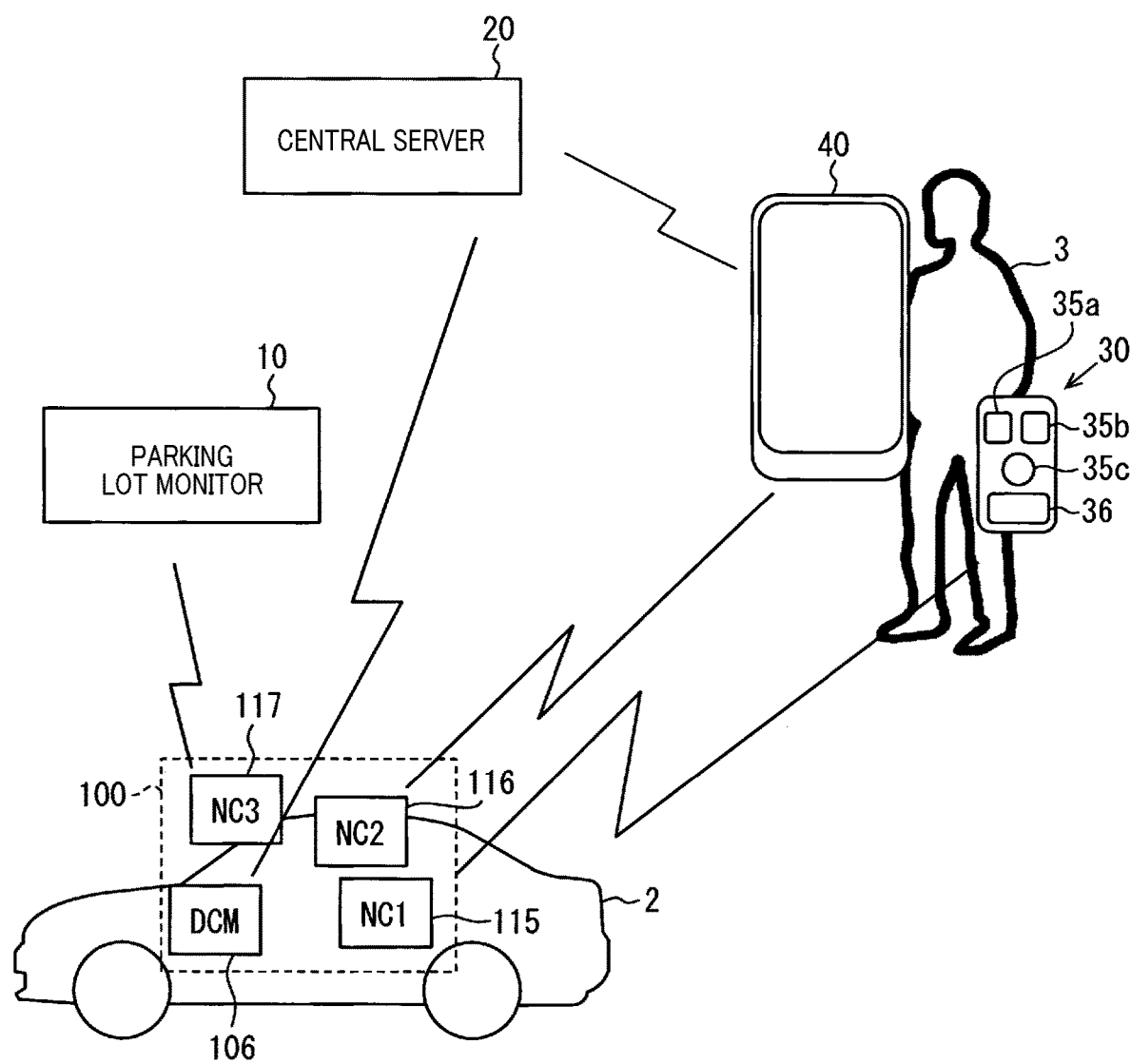
FIG. 1 is an overall diagram of automatic driving system for an automatically driven vehicle in accordance with a first embodiment of the present invention.

An automatic driving system 1 for an automatically driven vehicle in accordance with a first embodiment of the present invention will now be explained with reference to FIG. 1. The automatic driving system 1 includes, as shown in FIG. 1, a parking lot monitor 10, a central server 20, an electronic key 30 (as a mobile device), a smartphone 40 (as a mobile device), and a vehicle-mounted system 100. The smartphone 40 also serves as a mobile communication device.

The vehicle-mounted system 100 is mounted in the automatically driven vehicle 2. The electronic key 30 and the smartphone 40 are carried by a user 3 of the automatically driven vehicle 2. Automatic driving of the vehicle 2 is enabled by the vehicle-mounted system 100. Further, manned driving of the vehicle 2 is enabled as well. As shown in FIG. 1, the vehicle-mounted system 100 includes a data communication module (DCM) 106, a first near field communication unit (NC1) 115, a second near field communication unit (NC2) 116, and a third near field communication unit (NC3) 117. The other components of the vehicle-mounted system 100 will be described later with reference to FIG. 4.

The DCM 106 is configured to communicate wirelessly with the central server 20 and the smartphone 40 through a public communication network. The central server 20 and the smartphone 40 are also communicable with each other through the public communication network.

The first near field communication unit 115 is configured to communicate with the electronic key 30 using frequencies in the UHF band to receive, from the electronic key 30, a signal indicative of locking or unlocking of doors of the automatically driven vehicle 2 or a signal indicative of start or stop of automatic driving.

The second near field communication unit 116 is configured to communicate wirelessly with the smartphone 40 within a communication range of tens to hundreds of meters in compliance with a near field communication standard, such as Bluetooth (registered trademark). The second near field communication unit 116 may communicate wirelessly with the electronic key 30 as well.

The third near field communication unit 117 is configured to communicate with the parking lot monitor 10 in compliance with a communication standard used for vehicle-to-infrastructure and vehicle-to-vehicle communication.

Parking Lot Monitor

Figure 2:
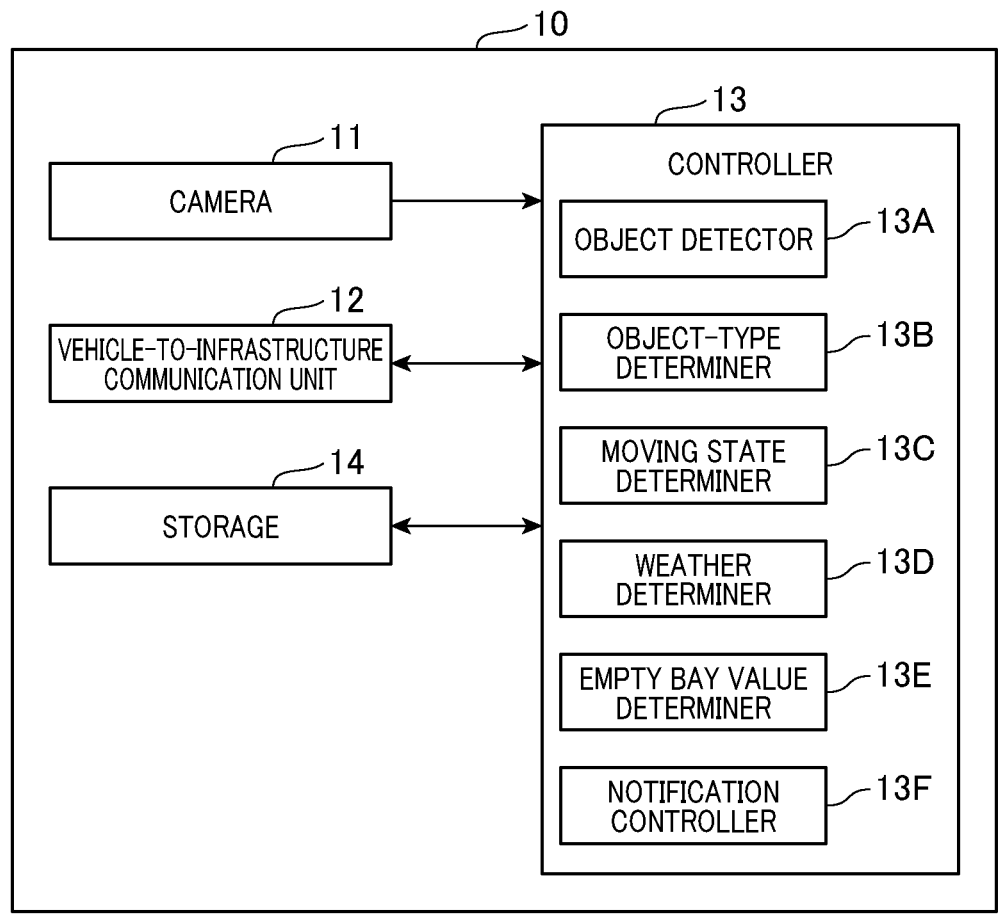
FIG. 2 is a block diagram of a parking lot monitor of FIG. 1.

The parking lot monitor 10 is installed in a parking lot to detect various parking lot information, such as information about objects present in the parking lot. As shown in FIG. 2, the parking lot monitor 10 includes a camera 11, a vehicle-to-infrastructure communication unit 12, a controller 13, and a storage 14.

The camera 11 is installed at a position at which the camera 11 can capture an entirety of the parking lot. If a single camera cannot capture the entirety of the parking lot, a plurality of cameras may be installed at different positions in the parking lot.

The vehicle-to-infrastructure communication unit 12 is configured to communicate with the third near field communication unit 117 of the vehicle-mounted system 100 in compliance with the communication standard used for vehicle-to-infrastructure and vehicle-to-vehicle communication, where, for example, the operating frequency is in the 700 MHz band, the 5.8 GHz band, or the 5.9 GHz band and the communication range is in the order of tens to hundreds of meters. The parking lot monitor 10 and the vehicle-mounted system 100 may communicate with each other via another communication unit than the vehicle-to-infrastructure communication unit 12.

The storage 14 has map data (hereinafter referred to as parking lot map data) stored therein for the parking lot monitored by the parking lot monitor 10. The parking lot map data includes information indicative of whether or not a direction of travel of each lane in the parking lot is defined (the information being referred to as travel direction information). The number of lanes of a passway is one if a length of the passway in the vehicle widthwise direction is equal to or greater than one vehicle width and less than two vehicle widths, where the passway corresponds to a single lane. The number of lanes of a passway is greater than two if a length of the passway in the vehicle widthwise direction is equal to or greater than two vehicle widths, where the passway corresponds to multiple lanes. In each case, the may be unidirectional or bidirectional.

The controller 13 may be a microcomputer including a central processing unit (CPU), a read-only memory (ROM), a random-access memory (RAM) and the like. Various functions may be implemented by the CPU executing computer programs stored in the ROM. The controller 13 includes, as function blocks corresponding to the various functions, an object detector 13A, an object-type determiner 13B, a moving state determiner 13C, a weather determiner 13D, an empty bay value determiner 13E, and a notification controller 13F. Some or all of the functions of the controller 13 may be implemented by hardware, for example, by a single integrated circuit (IC) or a plurality of integrated circuits.

The object detector 13A is configured to sequentially capture an image of the parking lot via the camera 11 and analyze the image using a well-known image analysis technique to detect a location of an object present in the parking lot.

The object-type determiner 13B is configured to determine a type of the object detected by the object detector 13A. For example, a degree of pattern matching between the detected object and each of various patterns may be determined. Object detection by the object detector 13A and object type detection by the object-type determiner 13B may be performed simultaneously. That is, an object may be detected using pattern matching or the like, and a type of the matching pattern matched to the detect object in pattern may be determined as a type of the detected object. Object types may include a person, a vehicle, and various animals.

The moving state determiner 13C is configured to, based on changes in the location of the object detected by the object detector 13A, determine whether the object detected by the object detector 13A is moving or stationary.

The weather determiner 13D is configured to analyze the image captured by the camera 11 and determine whether the (local) weather in the parking lot where the automatically driven vehicle 2 is parked is sunny, cloudy, rainy, snowy or foggy. The parking lot provided with the parking lot monitor 10 may be indoors or outdoors. In the case of the parking lot being indoors, the weather determiner 13D may be removed.

The empty bay value determiner 13E is configured to determine an empty bay value that is the number of empty bays in the parking lot or a ratio of the number of empty bays to the total number of bays in the parking lot. The empty bay value may be calculated by determining whether or not each bay in the parking lot is empty based on processing results of the object detector 13A and the object-type determiner 13B.

The notification controller 13F is configured to, using the vehicle-to-infrastructure communication unit 12, transmit information determined by the object detector 13A, the object-type determiner 13B, the moving state determiner 13C, the weather determiner 13D, and the empty bay value determiner 13E. Transmission modes used in the vehicle-to-infrastructure communication unit 12 may include broadcast transmission, unicast transmission, or multicast transmission.

Central Server

Figure 3:
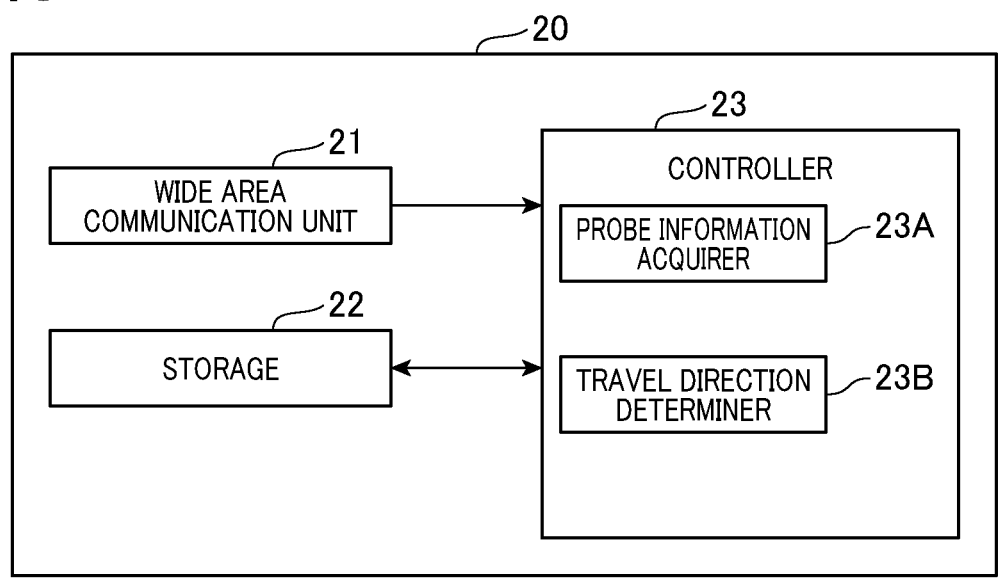
FIG. 3 is a block diagram of a central server of FIG. 1.

The central server 20 includes, as shown in FIG. 3, a wide area communication unit 21, a storage 22, and a controller 23. The wide area communication unit 21 is configured to conduct wide area communications via connection to a public communication network. The storage 22 has map data stored therein. The map data includes, as well as road data, information about locations and travel directions of lanes in each of at least some of the parking lots on the map. The travel direction information stored in the stored in the storage 22 is sequentially updated based on travel directions of lanes in each parking lot determined by the travel direction determiner 23B.

The controller 23 may be a microcomputer including a central processing unit (CPU), a read-only memory (ROM), a random-access memory (RAM) and the like. The controller 23 may serve as the probe information acquirer 23A and the travel direction determiner 23B by the CPU executing computer programs stored in the ROM. Some or all of the functions of the controller 23 may be implemented by hardware, for example, by a single integrated circuit (IC) or a plurality of integrated circuits.

The probe information acquirer 23A is configured to acquire, via the wide area communication unit 21, a trajectory of the vehicle having a function to provide a notification of the trajectory.

The travel direction determiner 23B is configured to, using the trajectories acquired by the probe information acquirer 23A, determine, for each of the parking lots included in the map data stored in the storage 22, directions of travel of lanes of the parking lot, for which lanes directions of travel are not stored in the storage 22. More specifically, if a lane having no definite travel direction stored in the storage 22 has vehicle trajectories in only one direction, the lane may be considered unidirectional. For a lane having no definite travel direction stored in the storage 22 which has vehicle trajectories in opposite directions (that is, being bidirectional) where a ratio of the number of trajectories in one direction to the total number of the trajectories is much higher than a ratio of the number of trajectories in the other direction to the total number of the trajectories or a ratio of the number of trajectories in one direction to the total number of the trajectories is higher than a predetermined ratio, the lane may be considered unidirectional, where the lane is defined as having the travel direction having the higher ratio. When the direction of travel of at least one lane having no definite travel direction stored in the storage 22 is determined, the travel direction information stored in the storage 22 is updated.

Vehicle-Mounted System

Figure 4:
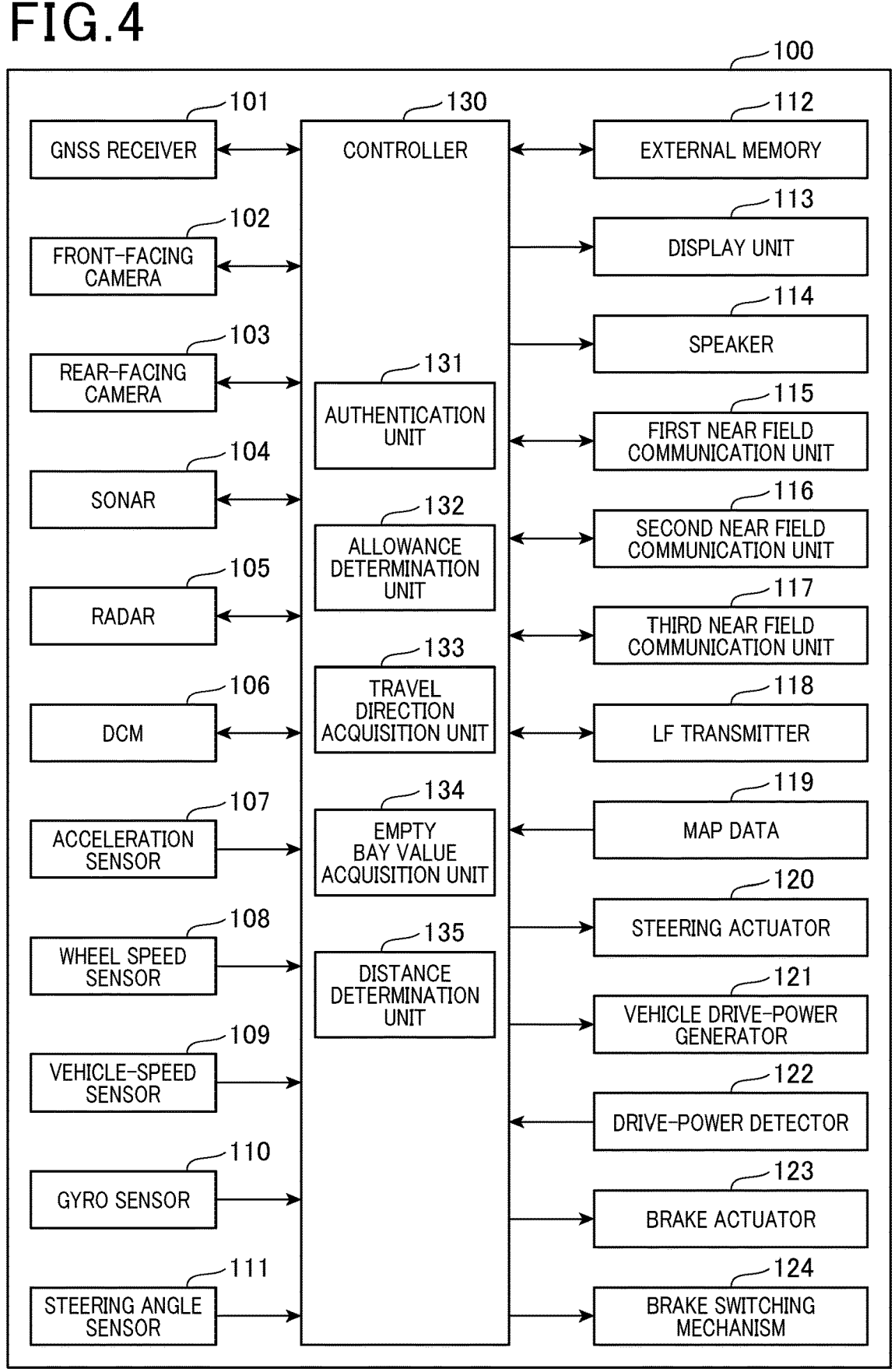
FIG. 4 is a block diagram of a vehicle-mounted system of FIG. 1.

The vehicle-mounted system 100 includes many components, as shown in FIG. 4. The controller 130 and the other components of the vehicle-mounted system 100 may be connected directly to each other, or may be connected via an on-board local area network (LAN).

The controller 130, as a vehicle-mounted apparatus, is configured to control the other components of the vehicle-mounted system 100 as shown in FIG. 4. The controller 130 may be formed of a single microcomputer including a central processing unit (CPU), a read-only memory (ROM), a random-access memory (RAM) and the like, or may be formed of a plurality of such microcomputers.

A GNSS receiver 101, as a vehicle location detector, is configured to receive radio waves from satellites of the global navigation satellite system (GNSS) to detect a location of the GNSS receiver 101 and input the detected location to the controller 130. The location detected by the GNSS receiver 101 is indicative of a location of the automatically driven vehicle 2.

A front-facing camera 102 is configured to capture an image of a predetermined area forward of the automatically driven vehicle 2. A rear-facing camera 103 is configured to capture an image of a predetermined area rearward of the automatically driven vehicle 2. The images captured by the front-facing camera 102 and the rear-facing camera 103 of the automatically driven vehicle 2 are inputted to the controller 130.

A sonar 104 is disposed on at least one of a front end face, a rear end face, and left and right side faces of the automatically driven vehicle 2 to detect a position of an object around the automatically driven vehicle 2. The position of the object detected by the sonar 104 is inputted to the controller 130.

A radar 105, which may be a millimeter-wave radar or a laser radar, is provided forward or/and rearward of the automatically driven vehicle 2. The radar 105 provided forward of the automatically driven vehicle 2 is configured to detect an object present in a probe-wave irradiated area forward of the automatically driven vehicle 2. The radar 105 provided rearward of the automatically driven vehicle 2 is configured to detect an object present in a probe-wave irradiated area rearward of the automatically driven vehicle 2. The position of the object detected by the radar 105 is inputted to the controller 130.

A data communication module (DCM) 106 is configured to conduct wide area wireless communication via a public communication network. An acceleration sensor 107 is configured to detect an acceleration experienced by the automatically driven vehicle 2. More specifically, the acceleration sensor 107 may be configured to detect an acceleration or accelerations along a single axis or two axes, and preferably, accelerations along the three axes.

A wheel speed sensor 108 is configured to detect a rotational speed of each wheel of the automatically driven vehicle 2. A vehicle-speed sensor 109 is configured to detect a speed of the automatically driven vehicle 2. A gyro sensor 110 is configured to detect a rate of change in each of an azimuth angle, a roll angle, and a pitch angle of the automatically driven vehicle 2. A steering angle sensor 111 is configured to detect a steering angle of the automatically driven vehicle 2. Detected values of the acceleration sensor 107, the wheel speed sensor 108, the vehicle-speed sensor 109, the gyro sensor 110, and the steering angle sensor 111 are inputted to the controller 130.

An external memory 112 is configured to store therein codes used to authenticate the electronic key 30 and the smartphone 40. The presence of the codes stored in the external memory 112 means that the electronic key 30 and the smartphone 40 are registered with the vehicle-mounted system 100.

The display unit 113 is configured to display whether or not the automatically driven vehicle 2 is in automatic driving. When the automatically driven vehicle 2 is in automatic driving, monitoring of surroundings monitoring sensors is displayed, where the surroundings monitoring sensors include the front-facing camera 102, the rear-facing camera 103, the sonar 104, and the radar 105.

A speaker 114 is configured to, during automatic driving of the automatically driven vehicle 2, output a sound in the vicinity of the automatically driven vehicle 2 to indicate that the automatically driven vehicle 2 is in automatic driving. The speaker 114 is further configured to output a sound in the vicinity of the automatically driven vehicle 2 prior to start of automatic driving to indicate the start of automatic driving. Another speaker may be provided to output a sound in a passenger compartment.

The first near field communication unit 115, the second near field communication unit 116, and the third near field communication unit 117 have been already explained. Hence, any repetitive description about them is omitted.

A low frequency (LF) transmitter 118 is configured to transmit a baseband signal received from the controller 130 as a radio wave in the LF band of 30 kHz-300 kHz (hereinafter referred to as an LF radio wave). An antenna of the LF transmitter 118 has a communication range of several meters.

Map data 119 is stored in a predetermined storage. As with the map data stored in storage 22 of the central server 20, the map data 119 includes, as well as road data, information about lanes in the parking lots on the map. The information about the lanes in the parking lots on the map may include information about whether or not there is a rule for travel directions of the lanes for at least some of the parking lots on the map. The storage storing the map data 119 may be another memory than the external memory 112, or may be included in the external memory 112.

A steering actuator 120 is configured to axially drive a rack shaft to steer the steered wheels. A vehicle drive-power generator 121, such as an internal-combustion engine, an electrical motor, or a combination of them, is configured to generate drive power for driving the automatically driven vehicle 2. A drive-power detector 122 is configured to detect the drive power generated by the drive-power generator 121. A detected drive power value is inputted to the controller 130.

A brake actuator 123 is configured to hydraulically or electrically compress a brake pad to decrease a rotational speed of a vehicle wheel.

A brake switching mechanism 124 is hydraulically or electrically controlled to switch a parking brake from locked to unlocked, and vice versa. The steering actuator 120, the drive-power generator 121, the brake actuator 123, the brake switching mechanism 124 are controlled by the controller 130.

Electronic Key

Figure 5:
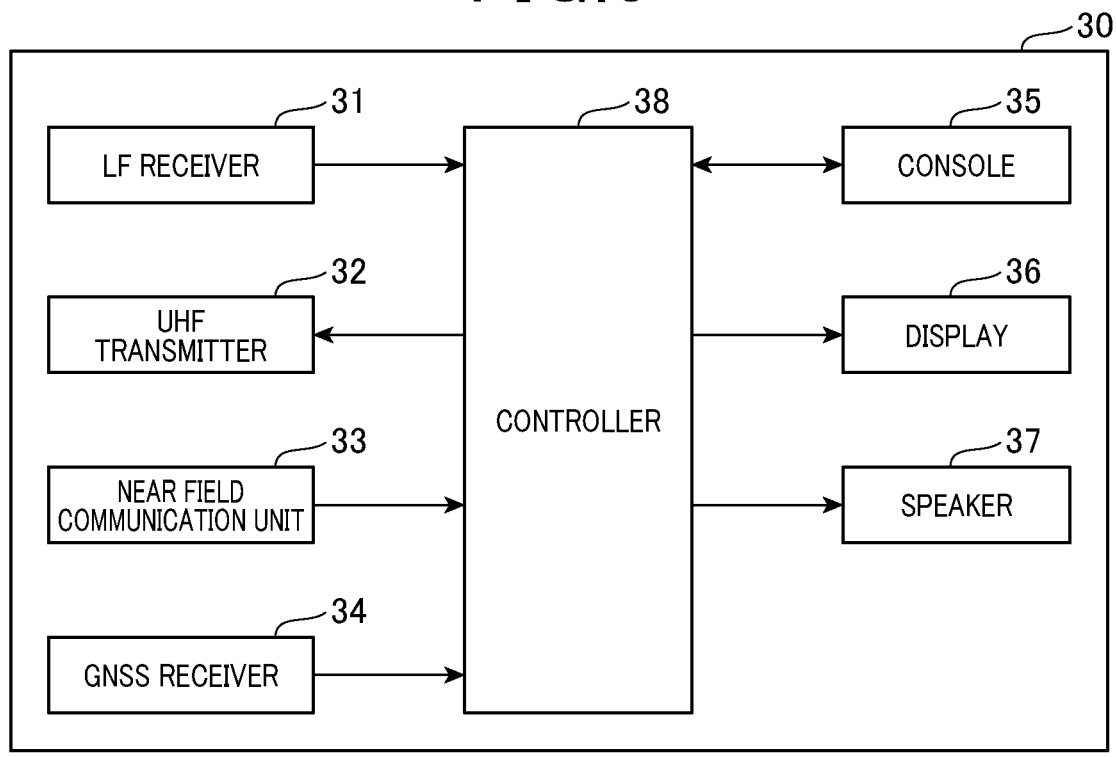
FIG. 5 is a block diagram of an electronic key of FIG. 1.

The electronic key 30 is registered with the vehicle-mounted system 100 as a device capable of remotely controlling the automatically driven vehicle 2. As shown in FIG. 5, the electronic key 30 includes an LF receiver 31, a UHF transmitter 32, a near field communication unit 33, a GNSS receiver 34, a console 35, a display 36, and a speaker 37.

The LF receiver 31 is configured to receive the LF radio wave transmitted by the LF transmitter 118 of the vehicle-mounted system 100, demodulate the received radio wave to extract the baseband signal, and output the extracted baseband signal to the controller 38. The UHF transmitter 32 is configured to modulate a signal received from the controller 38 and transmit the modulated signal as a UHF radio wave.

The near field communication unit 33 is configured to communicate wirelessly with the second near field communication unit 116 of the vehicle-mounted system 100 in compliance with the same near field communication standard as used in the second near field communication unit 116.

A GNSS receiver 34, which has the same configuration as the GNSS receiver 101 of the vehicle-mounted system 100 has, is configured to receive radio waves from the satellites of the global navigation satellite system to detect a current location of the GNSS receiver 34 based on the radio waves received from the satellites and input the detected current location to the controller 38.

A console 35 is provided with three switches 35a-35c, that is, a door lock switch 35a, a door unlock switch 35b, an automatic driving switch 35c. The door lock switch 35a is operated to transmit an instruction to lock doors of the automatically driven vehicle 2. The door unlock switch 35b is operated to transmit an instruction to unlock the doors of the automatically driven vehicle 2.

The automatic driving switch 35c is operated to start or stop automatic driving of the automatically driven vehicle 2. When the automatic driving switch 35c is activated while the automatically driven vehicle 2 is not in automatic driving, an instruction to start automatic driving of the automatically driven vehicle 2 will be transmitted. When the automatic driving switch 35c is activated while the automatically driven vehicle 2 is in automatic driving or driving automatically, an instruction to stop automatic driving of the automatically driven vehicle 2 will be transmitted. Alternatively, two switches may be separately provided, one for starting automatic driving and the other for stopping automatic driving.

A removable cover may be provided for preventing the automatic driving switch 35c from being operated. Ordinarily, the automatic driving switch 35c is covered with the removable cover and unexposed. When starting automatic driving is demanded, the cover is removed so that the automatic driving switch 35c can be operated. This can prevent the automatic driving switch 35c from being inadvertently activated.

Various messages, such as a message indicative of whether or not the automatically driven vehicle 2 is in automatic driving, may be displayed on the display 36.

Smartphone

Figure 6:
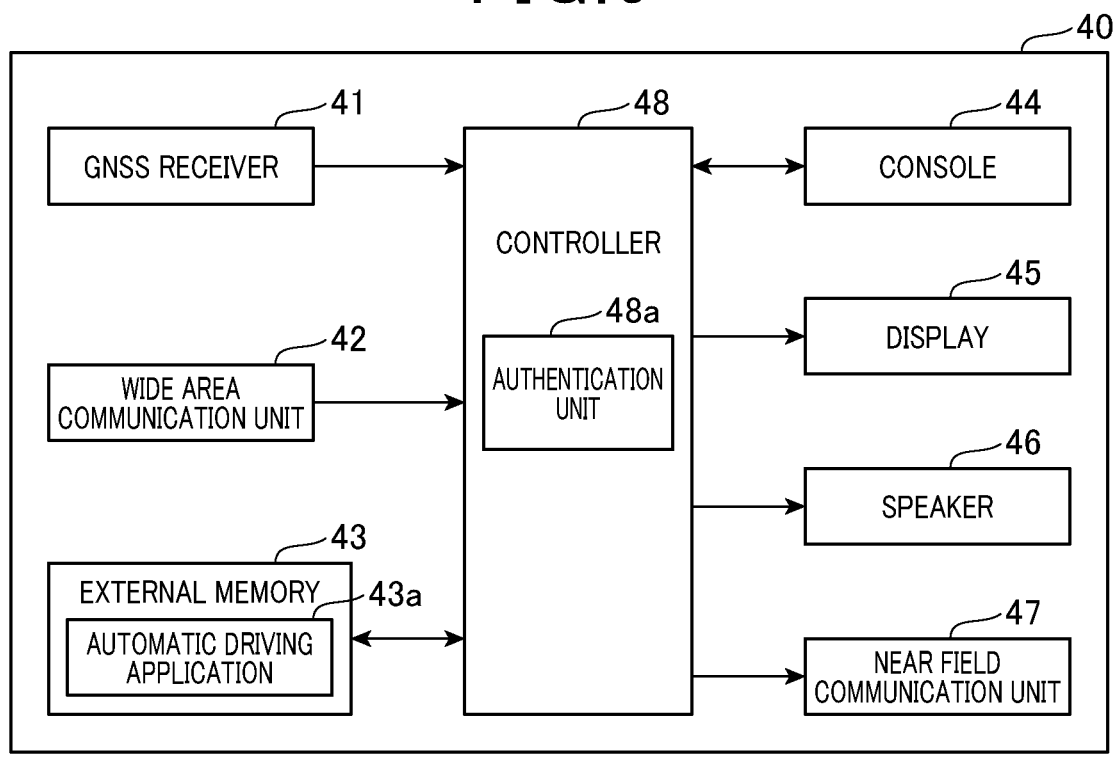
FIG. 6 is a block diagram of a smartphone of FIG. 1.

The smartphone 40 is pre-registered with the vehicle-mounted system 100 and the electronic key 30 as belonging to the user 3 of the automatically driven vehicle 2. As shown in FIG. 6, the smartphone 40 includes a GNSS receiver 41, a wide area communication unit 42, an external memory 43, a console 44, a display 45, a speaker 46, and a near field communication unit 47.

A GNSS receiver 41, which has the same configuration as the GNSS receiver 101 or 41 of the vehicle-mounted system 100 or the electronic key 30 has, is configured to receive radio waves from the satellites of the global navigation satellite system to detect a current location of the GNSS receiver 41 based on the radio waves received from the satellites and input the detected current location to the controller 48.

The wide area communication unit 42 is configured to conduct wide area communication via connection to the public communication network. The smartphone 40 is configured to communicate with the central server 20 and the DCM 106 of the vehicle-mounted system 100 via the wide area communication unit 42.

The external memory 43 may be a writable non-volatile memory, such as a flash memory or the like. Some of applications installed on the smartphone 40 are stored in the external memory 43. In the present embodiment, an automatic driving application 43a is stored in the external memory 43. The automatic driving application 43a is executed when the user 3 guides the automatically driven vehicle 2 in automatic driving. Execution of the automatic driving application 43a allows the user 3 to start or stop automatic driving, determine a location of the automatically driven vehicle 2 during automatic driving or check a condition surrounding the automatically driven vehicle 2 via the smartphone 40.

The console 44 may include a touch panel superimposed on a viewing surface of the display 45 or a mechanical switch surrounding the display 45. The user 3 operates the console 44 to provide an automatic-driving start instruction to start automatic driving or an automatic-driving stop instruction to stop automatic driving.

The display 45 is configured to, during execution of the automatic driving application 43a, display whether or not the automatically driven vehicle 2 is in automatic driving or the condition surrounding the automatically driven vehicle 2, or the like. The speaker 46 is configured to output a sound that indicates that automatic driving has been started or a sound that indicates automatic driving has been stopped.

The near field communication unit 47 is configured to communicate wirelessly with the second near field communication unit 116 of the vehicle-mounted system 100 and the near field communication unit 33 of the electronic key 30 in compliance with the same near field communication standard as used in the second near field communication unit 116 and the near field communication unit 33.

Process at Startup of Automatic Driving

Figure 7:
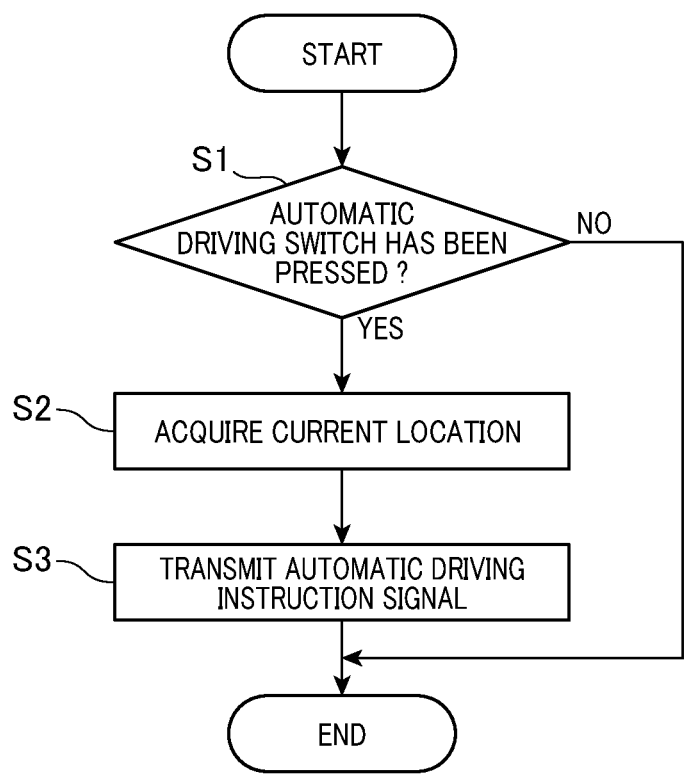
FIG. 7 is a flowchart of a process performed in a controller of the electronic key at startup of automatic driving in accordance with the first embodiment.

Processes performed in the electronic key 30 and the vehicle-mounted system 100 at startup of automatic driving will now be explained. The controller 38 of the electronic key 30 performs the process shown in FIG. 7 periodically. In step S1, it is determined whether or not the automatic driving switch 35c has been pressed. If in step S1 it is determined that the automatic driving switch 35c has not been pressed yet, then the process of FIG. 7 ends. If in step S1 it is determined that the automatic driving switch 35c has been pressed, then the process of FIG. 7 proceeds to step S2.

In step S2, a current location of the electronic key 30 is acquired from the GNSS receiver 34. In step S3, an automatic driving instruction signal including the current location acquired in step S2 is transmitted from the near field communication unit 33 to the vehicle-mounted system 100. The automatic driving instruction signal includes a code used to authenticate the electronic key 30 as included in a signal transmitted from an electronic key of a well-known electronic key system. Alternatively, the automatic driving instruction signal may be transmitted from the UHF transmitter 32.

Figure 8:
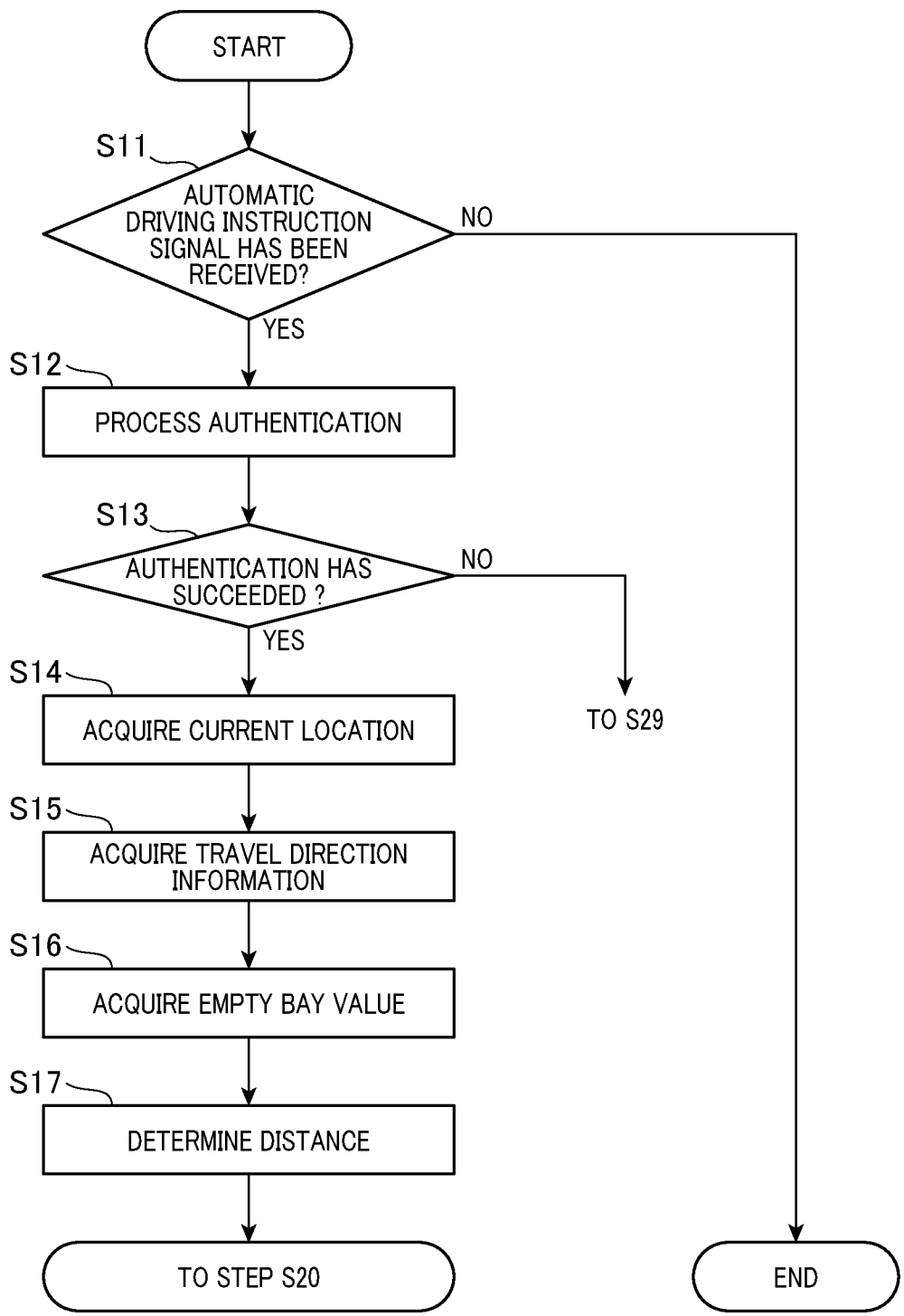
FIG. 8 is a flowchart of a process performed in a controller of the vehicle-mounted system at startup of automatic driving in accordance with the first embodiment.

The controller 130 of the vehicle-mounted system 100 performs a process shown in FIG. 8 periodically when the automatically driven vehicle 2 is in a stationary state. When an ignition switch is off, the automatically driven vehicle 2 is in the stationary state. Therefore, the process of FIG. 8 may be performed when the ignition switch is off. In addition, even when the ignition switch is on, the process of FIG. 8 may be performed when the shift position is at a parking position. The controller 130 of the vehicle-mounted system 100 includes, as shown in FIG. 4, an authentication unit 131, an allowance determination unit 132, a travel direction acquisition unit 133, an empty bay value acquisition unit 134, and a distance determination unit 135. The authentication unit 131 is responsible for execution of step S12. The allowance determination unit 132 is responsible for execution of steps S13, S20. The travel direction acquisition unit 133 is responsible for execution of step S15. The empty bay value acquisition unit 134 is responsible for execution of step S16. The distance determination unit 135 is responsible for execution of step S17.

In step S11, it is determined whether or not the automatic driving instruction signal has been received. As described above, the automatic driving instruction signal is transmitted in step S3 of FIG. 7 from the electronic key 30. If in step S11 it is determined that the automatic driving instruction signal has not been received, then the process of FIG. 8 ends. If in step S11 it is determined that the automatic driving instruction signal has been received, then the process of FIG. 8 proceeds to step S12.

In step S12, authentication for the automatic driving instruction signal is processed, where the code included in the automatic driving instruction signal and the code stored in the external memory 112 are matched.

In step S13, it is determined whether or not the authentication in step S12 has succeeded. If the authentication in step S12 has failed, then the process proceeds to step S29 of FIG. 9. If it is determined that the authentication has succeeded, then the process proceeds to step S14.

If in step S13 it is determined that the authentication in step S12 has failed, automatic driving is disallowed. Also in step S20 described later, it is determined whether or not automatic driving is allowed. Therefore, the allowance determination unit 132 is responsible for execution of steps S13, S20.

In step S14, a current location of the automatically driven vehicle 2 is acquired from the GNSS receiver 101. For example, a current location of the automatically driven vehicle 2 acquired from the GNSS receiver 101 immediately before the automatically driven vehicle 2 is stopped may be stored in the external memory 112. In step S14, the latest location of the automatically driven vehicle 2 stored in the external memory 112 may be acquired as the current location of the automatically driven vehicle 2.

In step S15, a travel direction acquisition process is performed, in which the travel direction information is acquired. In the travel direction acquisition process, the controller 130, specifically, the travel direction acquisition unit 133, tries to acquire the travel direction information of the parking lot identified by the current location of the automatically driven vehicle 2 acquired in step S14 from various sources of the travel direction information. The various sources include at least one of the external memory 112, the map data 119, the parking lot monitor 10, and the central server 20.

In step S16, an empty bay value acquisition process is performed, where the controller 130, specifically, the empty bay value acquisition unit 134, tries to communicate with the parking lot monitor 10 and acquire, from the parking lot monitor 10, the empty bay value determined by the controller 13 of the parking lot monitor 10.

Alternatively, an image of surroundings of the automatically driven vehicle 2 may be captured by using either or both of the front-facing camera 102 and the rear-facing camera 103, and the empty bay value may be determined by analyzing the captured image. If there are obviously many empty bays in the parking lot, the image analysis of the image captured by either or both of the front-facing camera 102 and the rear-facing camera 103 allows the empty bay value to be determined approximately.

In step S17, the controller 130, specifically, the distance determination unit 135, determines a distance between the automatically driven vehicle 2 and the electronic key 30 that has transmitted the automatic driving instruction signal. This distance is determined based on the current location included in the automatic driving instruction signal and the current location acquired in step S14. Thereafter, an allowance determination process shown in FIG. 9 is performed in step S20.

The allowance determination process in step S20 will now be explained with reference to FIG. 9. In step S21, it is determined whether or not the distance determined in step S17 is within an allowable distance range by comparing the distance determined in step S17 with an allowable distance threshold. If it is determined that the distance determined in step S17 is out of the allowable distance range, then the process proceeds to step S29.

In step S29, a disallowance notification (as a disallowance signal) is transmitted from the second near field communication unit 116 (serving as a transmitter) to the electronic key 30 that has transmitted the automatic driving instruction signal. The electronic key 30 receives the disallowance notification via the near field communication unit 33 (serving as a receiver). Upon receipt of the disallowance notification via the near field communication unit 33, the controller 38 controls the display 36 to display that automatic driving has been disallowed.

Figure 9:
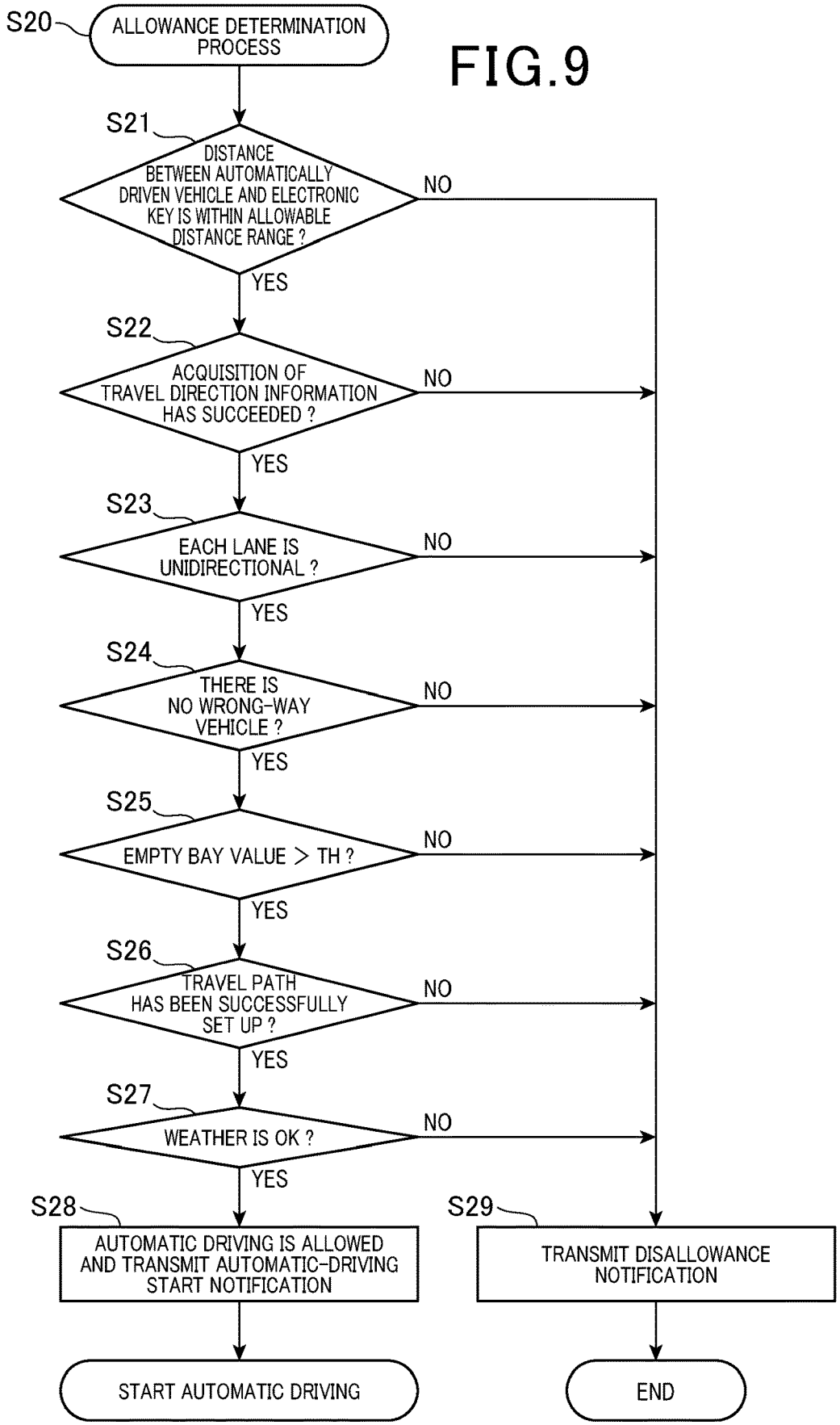
FIG. 9 is a flowchart of a process subsequent to the process of FIG. 8 performed in the controller of the vehicle-mounted system in accordance with the first embodiment.

After completion of step S29, the process of FIG. 9 ends. If the distance between the automatically driven vehicle 2 and the electronic key 30 is out of the allowable distance range, automatic driving is not performed. The allowable distance range is predefined. For example, the allowable distance range may be predefined such that a distance between the user 3 lying at an entrance of a large parking lot and the automatically driven vehicle 2 parked at a far end of the large parking lot is within the allowable distance range.

If in step S21 it is determined that the distance determined in step S17 is within the allowable distance range, then the process proceeds to step S22. In step S22, it is determined whether or not the acquisition of the travel direction information in step S15 has succeeded. If the automatically driven vehicle 2 is not located in the parking lot or if acquisition of the travel direction information has failed despite the automatically driven vehicle 2 being located in the parking lot, the process proceeds to step S29, where the disallowance notification is transmitted. If in step S22 it is determined that the acquisition of the travel direction information has succeeded, then the process proceeds to step S23.

In step S23, it is determined whether or not the travel direction information acquired in step S22 indicates that each of the lanes in the parking lot is unidirectional. In the case of the width of the passway between parking bays on opposite sides being equal to or greater than two vehicle widths, the passway may have multiple lanes. If in step S23 at least one of the lanes of the parking lot is not unidirectional, the process proceeds to step S29. In the present embodiment, if at least one of the lanes in the parking lot is bidirectional, automatic driving is not disallowed.

If in step S23 it is determined that each of the lanes in the parking lot is unidirectional, then in step S24 it is determined whether or not there is a wrong-way vehicle in the lanes. To this end, the controller 130 communicates with the parking lot monitor 10 to acquire a direction of movement of each of the other vehicles in the lanes. Since the controller 13 of the parking lot monitor 10 includes the object-type determiner 13B, the moving state determiner 13C, and the notification controller 13F, the controller 13 of the parking lot monitor 10 can transmit to the vehicle-mounted system 100 the direction of movement of each of the other vehicles in the lanes. Based on the direction of movement of each of the other vehicles in the lanes, it is determined whether or not there is a wrong-way vehicle in the lanes. Alternatively, the controller 130 may acquire the probe information acquired by the probe information acquirer 23A of the central server 20 via the wide area communication unit 21 and the DCM 106, and based on the probe information, determine whether or not there is a wrong-way vehicle in the lanes.

In step S24, it may only be determined whether or not there is currently a wrong-way vehicle in the lanes. Alternatively, it may be determined whether or not there has been a wrong-way vehicle in the lanes in a predetermined past time period. Still alternatively, the presence or absence of a wrong-way vehicle may be determined by the parking lot monitor 10 or the central server 20. Based on the determination of the parking lot monitor 10 or the central server 20, it may be determined in step S24 whether or not there is a wrong-way vehicle in the lanes.

In addition, if there are a few wrong-way vehicles in the past time period, the wrong-way vehicles do not have to be taken into consideration. Therefore, if the number of wrong-way vehicles in the past time period is equal to or less than an allowable number, it may be determined that there are no wrong-way vehicles in the lanes.

In the case of the travel direction information indicating that substantially all the lanes in the parking lot are unidirectional taking into account the presence or absence of the wrong-way vehicle in the lanes, it may be determined by using the travel direction information whether or not there has been a wrong-way vehicle in the lanes.

If it is determined in step S24 that there is a wrong-way vehicle in the lanes, the process proceeds to step S29. That is, also in the presence of the wrong-way vehicle, automatic driving is disallowed. If it is determined in step S24 that there is no wrong-way vehicle in the lanes, the process proceeds to step S25.

In step S25, it is determined based on a result of the empty bay value acquisition process in step S16 whether or not the empty bay value is greater than a predetermined allowable reference value TH. In the presence of a few empty bays in the parking lot, there may be a vehicle where a driver attempts to forcibly park in one of the empty bays. The predetermined allowable reference value TH is set to a value, at which it can be assumed that the number of such vehicles is not significant. If in step S25 it is determined that the empty bay value is equal to or less than the predetermined allowable reference value TH, then the process proceeds to step S29.

If in step S25 it is determined that the empty bay value is greater than the predetermined allowable reference value TH, then the process proceeds to step S26. In step S26, it is determined whether or not a travel path along which the automatically driven vehicle 2 can be automatically driven to a location of the user 3 has been set up based on the travel directions of the lanes. Such a travel path is not necessarily a shortest path from the automatically driven vehicle 2 to the user 3.

Figure 10:
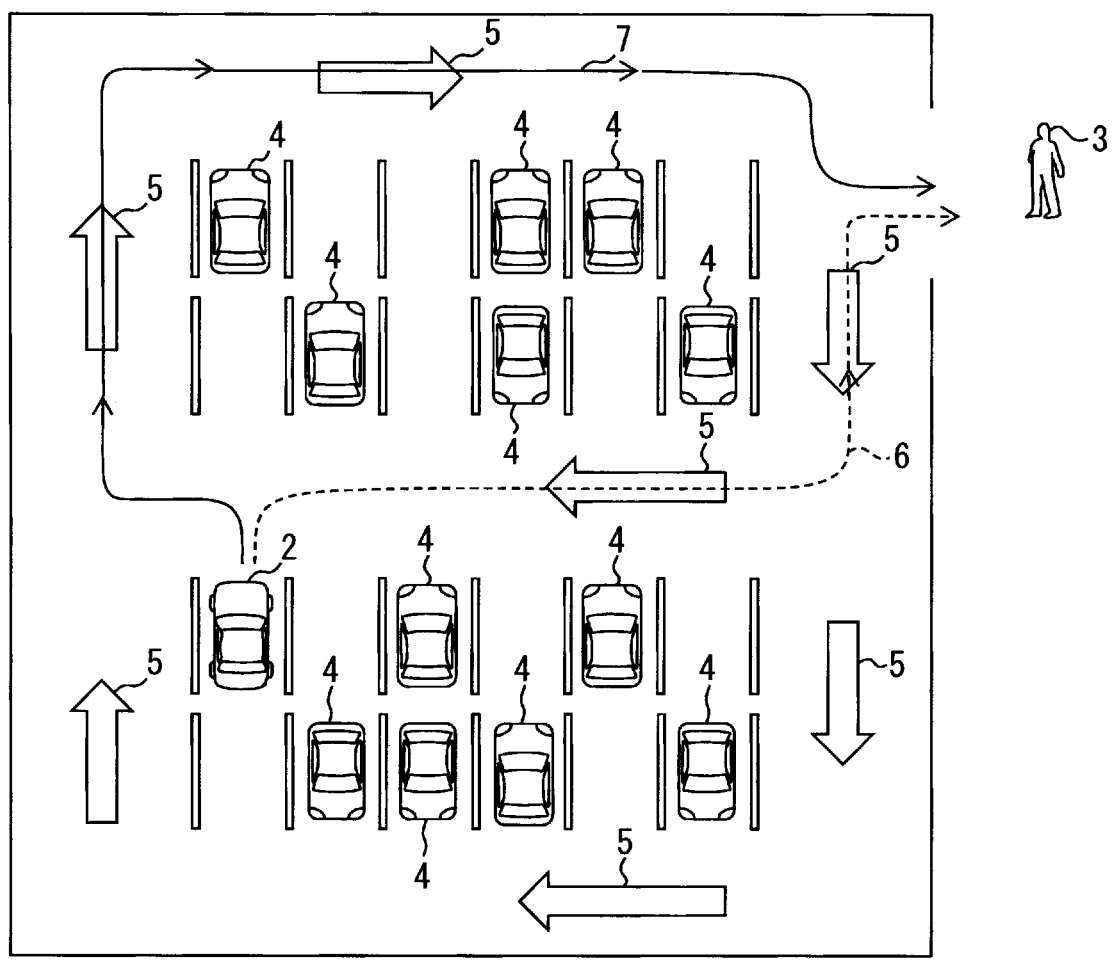
FIG. 10 is an example of a travel path along which an automatically driven vehicle travels to a user.

FIG. 10 is an example of the travel path where the user 3 is lying at the entrance of a parking lot. In the example of FIG. 10, only one-way lanes are provided as indicated by arrows 5, and there are a lot of unoccupied parking bays. In addition, there is no wrong-way vehicle in each lane. Therefore, YES is determined in each of steps S22-S26. Since the automatically driven vehicle 2 does not necessarily travel along the shortest path to the user 3, the automatically driven vehicle 2 may travel further from the user 3 along part of the travel path 7.

Even if in step S26 it is determined that a travel path along which the automatically driven vehicle 2 can be automatically driven to a location of the user 3 cannot be set up, the process proceeds to step S29. If in step S26 it is determined that a travel path along which the automatically driven vehicle 2 can be automatically driven to a location of the user 3 has been successfully set up, then the process proceeds to step S27. In step S27, it is determined whether or not the weather in the parking lot allows automatic driving. The weather in the parking lot that allows the automatic driven may be sunny or cloudy. In the case of the indoor parking lot, it is determined that the weather allows automatic driving.

In other words, in the case of the outdoor parking lot, it is determined that each of rainy weather, foggy weather, and snowy weather disallows automatic driving. The weather in the parking lot can be acquired via communications with the parking lot monitor 10 or the central server 20. Alternatively, the weather in the parking lot may be determined by capturing an image of surroundings of the automatically driven vehicle 2 via at least one of the front-facing camera 102 and the rear-facing camera 103 and analyzing the captured image. If in step S27 it is determined that the weather in the parking lot disallows automatic driving, then the process proceeds to step S29. Otherwise, the process proceeds to step S28.

In step S28, automatic driving is determined to be allowed and an automatic-driving start notification is transmitted to the electronic key 30. Upon receipt of the automatic-driving start notification at the electronic key 30, an indication that automatic driving is about to start is displayed on the display 36.

Process Performed in Vehicle-Mounted System After Start of Automatic Driving

Figure 11:
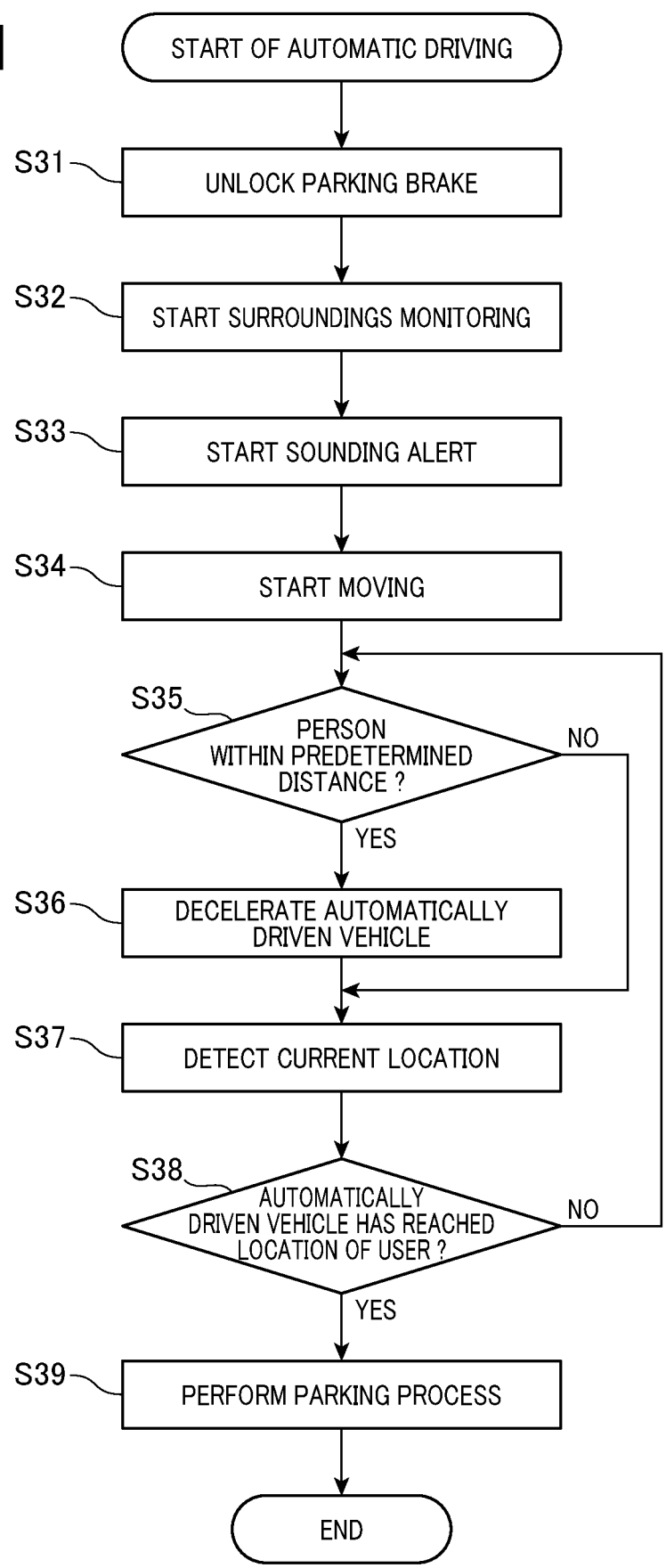
FIG. 11 is a flowchart of a process performed in the controller of the vehicle-mounted system after the startup of automatic driving in accordance with the first embodiment.

Subsequently to step S28, a process of FIG. 11 is performed by the controller 130 after automatic driving is started. In step S31, the brake switching mechanism 124 is activated to release or unlock the parking brake. At the same time, the brake actuator 123 is activated to prevent the wheels from rotating.

In step S32, the surroundings monitoring sensors are activated to start surroundings monitoring. In step S33, sounding an alert from the speaker 114 (serving as a warning unit) is started to ensure that persons in the parking lot are aware that the automatically driven vehicle 2 is in automatic driving or driving automatically. Thereafter, the speaker 114 sounds the alert periodically.

In step S34, the automatically driven vehicle starts moving or running. The automatically driven vehicle may start moving after a certain period of time elapses after sounding the alert from the speaker 114 is started. The certain period of time may be several to tens of seconds.

During automatic driving, the steering actuator 120 is used to control a traveling direction of the automatically driven vehicle 2 while controlling the speed of the automatically driven vehicle 2 by controlling the drive-power generator 121 and the brake actuator 123. The automatically driven vehicle 2 thereby travels along the travel path 7 set up prior to the start of automatic driving. During automatic driving, surroundings monitoring is conducted periodically by using the front-facing camera 102, the rear-facing camera 103, the sonar 104, and the radar 105.

In step S35, based on results of the surroundings monitoring, it is determined whether or not there is a person within a predetermined distance from the automatically driven vehicle 2. The determination may be made by using the surroundings monitoring sensors or may be made not only by using the surroundings monitoring sensors, but also by acquiring a location of the person from the parking lot monitor 10. If in step S35 it is determined that there is a person within the predetermined distance from the automatically driven vehicle 2, then the process proceeds to step S36.

In step S36, the automatically driven vehicle 2 is decelerated so that the person detected around the automatically driven vehicle 2 can pay attention to the presence of the automatically driven vehicle 2. The person detected around the automatically driven vehicle 2 can thereby know that the automatically driven vehicle 2 has recognized the presence of the person. If in step S35 it is determined that there is no person within the predetermined distance from the automatically driven vehicle 2, or after the automatically driven vehicle 2 is decelerated, the process proceeds to step S37.

In step S37, a current location of the automatically driven vehicle 2 is detected. The current location of the automatically driven vehicle 2 is detected using the GNSS receiver 101. Alternatively, the current location of the automatically driven vehicle 2 may be detected based on a trajectory produced by using the vehicle-speed sensor 109, the wheel speed sensor 108, the acceleration sensor 107, the steering angle sensor 111, and a location at which the automatically driven vehicle 2 is parked in the parking lot determined by the parking lot map. The current location of the automatically driven vehicle 2 may be acquired from the parking lot monitor 10 since the parking lot monitor 10 monitors a location of the automatically driven vehicle 2 in the parking lot.

In step S38, it is determined whether or not the automatically driven vehicle 2 has reached the location of the user 3.

If in step S38 it is determined that the automatically driven vehicle 2 has not reached the location of the user 3 yet, then the process returns to step S35 and automatic driving is continued. If in step S38 it is determined that the automatically driven vehicle 2 has reached the location of the user 3, then the process proceeds to step S39.

In step S39, a parking process is performed, where the parking brake is locked by deactivating the drive-power generator 121 and activating the brake switching mechanism 124.

Advantages

In the automatic driving system 1 of the first embodiment as described above, if it is not determined that the lanes in the parking lot are unidirectional, automatic driving is not disallowed. Therefore, during automatic driving, a situation can be avoided where the automatically driven vehicle 2 and another vehicle faces each other in the same lane, which can reduce the need for a complex automatic driving control, such as backward movement. This can improve the reliability of automatic driving in the parking lot.

Automatic driving is allowed if an additional set of allowance conditions are met, that is, if in step S24 it is determined that there is no wrong-way vehicle in the lanes of the parking lot, if in step S25 it is determined that the empty bay value is greater than the allowable reference value TH, if in step S26 it is determined that the planned travel path formed of unidirectional lanes has been successfully set up, and if in step S27 it is determined that the weather in the parking lot allows automatic driving. These additional conditions for allowing automatic driving may further reduce the need for a complex automatic driving control. This can further improve the reliability of automatic driving in the parking lot.

In addition, if in step S21 it is determined that the distance between the automatically driven vehicle 2 and the user 3 is out of the allowable distance range, automatic driving is disallowed. In the presence of trouble with the automatically driven vehicle 2, this facilitates the user 3 reaching the automatically driven vehicle 2.

If automatic driving is disallowed, the disallowance notification is transmitted to the electronic key 30 in step S29. This allows the user 3 to avoid a situation where the user 3 waits for the automatically driven vehicle 2 to reach the location of the user 3 despite automatic driving having not been started.

When starting automatic driving, the vehicle-mounted system 100 sounds the alert in step S33 after the conditions for allowing automatic driving are met and prior to the automatically driven vehicle 2 starting to move. This allows a person around the automatically driven vehicle 2 to pay attention to motion of the automatically driven vehicle 2 before the automatically driven vehicle 2 starts to move.

If a person is detected within a predetermined distance from the automatically driven vehicle 2 during automatic driving, the automatically driven vehicle 2 decelerates in step S36. This allows the person detected around the automatically driven vehicle 2 to know that the automatically driven vehicle 2 has recognized the presence of the person. In addition, the deceleration of the automatically driven vehicle 2 facilitates the person detected around the automatically driven vehicle 2 avoiding the automatically driven vehicle 2.

Second Embodiment

A second embodiment of the present invention will now be explained. In the present and subsequent embodiments, elements having the same functions as in the first embodiment are assigned the same numbers, except where specified otherwise, and will not be described again for brevity.

Figure 12:
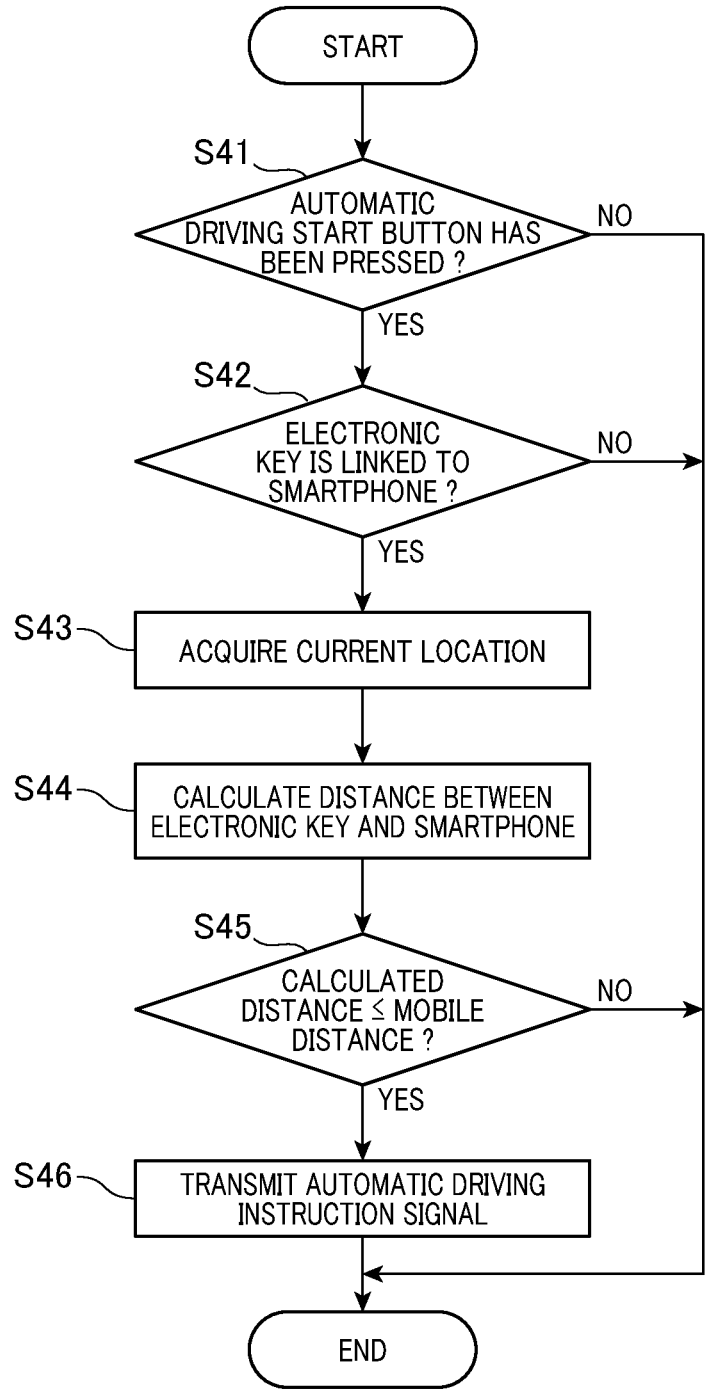
FIG. 12 is a flowchart of a process performed in the controller of the electronic key in accordance with a second embodiment.

In the present embodiment, the controller 38 of the electronic key 30 performs the process shown in FIG. 12 as an alternative to the process of FIG. 8. In step S41, it is determined whether or not the automatic driving switch 35c has been pressed. If in step S41 it is determined that the automatic driving switch 35c has not been pressed yet, then the process of FIG. 12 ends. If in step S41 it is determined that the automatic driving switch 35c has been pressed, then the process of FIG. 12 proceeds to step S42.

In step S42, it is determined whether or not the electronic key 30 is linked to the smartphone 40. That is, for example, it is determined whether or not authentication between the electronic key 30 and the smartphone 40 has succeeded and then the electronic key 30 and the smartphone 40 have become communicable with each other. If in step S42 it is determined that the electronic key 30 is not linked to the smartphone 40, then the process of FIG. 12 ends. If in step S42 it is determined that the electronic key 30 is linked to the smartphone 40, then the process of FIG. 12 proceeds to step S43. The electronic key 30 and the smartphone 40 may be linked beforehand or a request for the linking operation to the user 3 may be displayed on the display 36 or sounded from the speaker 37 when performing step S42.

In any case, the electronic key 30 can be linked only to the smartphone 40 with which the electronic key 30 is pre-registered. The registration of the electronic key 30 with the smartphone 40 may be performed by the user 3 or an automobile retailer employee.

In step S43, a current location of the electronic key 30 is acquired. The current location of the electronic key 30 may be acquired from the GNSS receiver 34 of the electronic key 30 or from the smartphone 40. In the configuration where the current location of the electronic key 30 is acquired from the smartphone 40, the GNSS receiver 34 may be removed from the electronic key 30.

In step S44, a distance between the electronic key 30 and the smartphone 40 is calculated. For example, the distance between the electronic key 30 and the smartphone 40 may be calculated based on the strength of a radio wave transmitted by the near field communication unit 47 of the smartphone 40 and then received by the near field communication unit 33 of the electronic key 30. Since the radio wave strength decreases with distance, the distance can be calculated from the radio wave strength. Alternatively, the distance between the electronic key 30 and the smartphone 40 may be calculated from the current locations detected by the GNSS receivers 34, 41 of the electronic key 30 and the smartphone 40.

In step S45, it is determined whether or not the distance calculated in step S44 is equal to or less than a threshold distance (referred to as a mobile distance). The mobile distance is a predefined distance such that, if a distance between the electronic key 30 and the smartphone 40 is equal to or less than the mobile distance, it can be assumed that both the electronic key 30 and the smartphone 40 are carried by the user 3. The mobile distance may be set to about several meters. This because that the user 3 may wear one of the electronic key 30 and the smartphone 40 and carry the other in a bag that may be placed at a short distance from the user 3.

Alternatively, step S44 may be skipped, and in step S45, it may be determined whether or not the distance between the electronic key 30 and the smartphone 40 is equal to or less than the mobile distance by comparing the strength of the received radio wave with a radio wave strength threshold. If in step S45 it is determined that the distance is greater than the mobile distance, the process of FIG. 12 ends. If in step S45 it is determined that the distance is equal to or less than the mobile distance, then the process of FIG. 12 proceeds to step S46.

In step S46, an automatic driving instruction signal (as an authentication signal) including the current location acquired in step S43 and a code used to authenticate the electronic key 30 is transmitted from the near field communication unit 47 or from the UHF transmitter 32 to the vehicle-mounted system 100, as in the first embodiment.

Advantages

In the present embodiment, only if the distance between the electronic key 30 and the smartphone 40 is equal to or less than the mobile distance, the automatic driving instruction signal is allowed to be transmitted (in steps S45, S46). Even in the event that the user 3 has lost the electronic key 30 and another person has found and picked up the electronic key 30, the person caring electronic key 30 fails to start automatic driving of the automatically driven vehicle 2 since the smartphone 40 is not carried the person. This can reduce the possibility of the automatically driven vehicle 2 being operated by a stranger or an unauthorized person.

Third Embodiment

Figure 13:
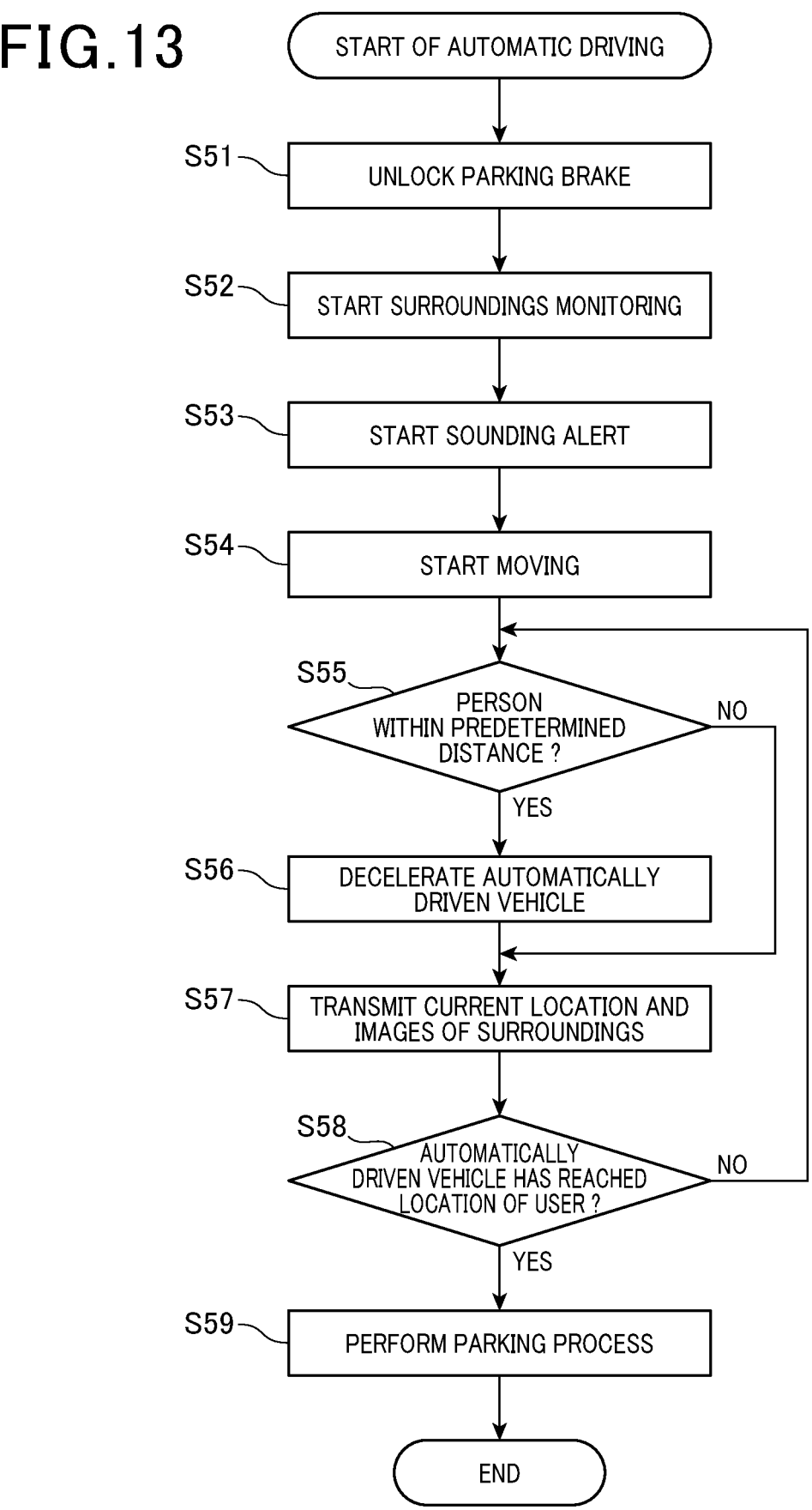
FIG. 13 is a flowchart of a process performed in the controller of the vehicle-mounted system in accordance with a third embodiment.

A third embodiment will now be explained with reference to FIG. 13. In the present embodiment, after automatic driving is started, a process of FIG. 13, as an alternative to the process of FIG. 11, is performed. In FIG. 13, steps S51 to 56 are the same as steps S31 to S36 of FIG. 11. Steps S58, S59 are the same as steps S38, S39 of FIG. 11. That is, the process of FIG. 13 is different from the process of FIG. 11 only in step S57.

In step S57, a driving condition signal (as a surroundings condition signal) including the current location of the automatically driven vehicle 2 detected as in step S37 and the latest forward and rearward images is transmitted to the smartphone 40. The forward image is an image captured by the front-facing camera 102, and the rearward image is an image captured by the rear-facing camera 103.

To transmit the driving condition signal, it is necessary that the vehicle-mounted system 100 and the smartphone 40 are linked to each other. To start communications between the vehicle-mounted system 100 and the smartphone 40, a registration process, such as a pairing process, is performed beforehand. Communications between the vehicle-mounted system 100 and the smartphone 40 can be established if the distance between the vehicle-mounted system 100 and the smartphone 40 is equal to or less than a communication distance of the near field communication unit 47.

Figure 14:
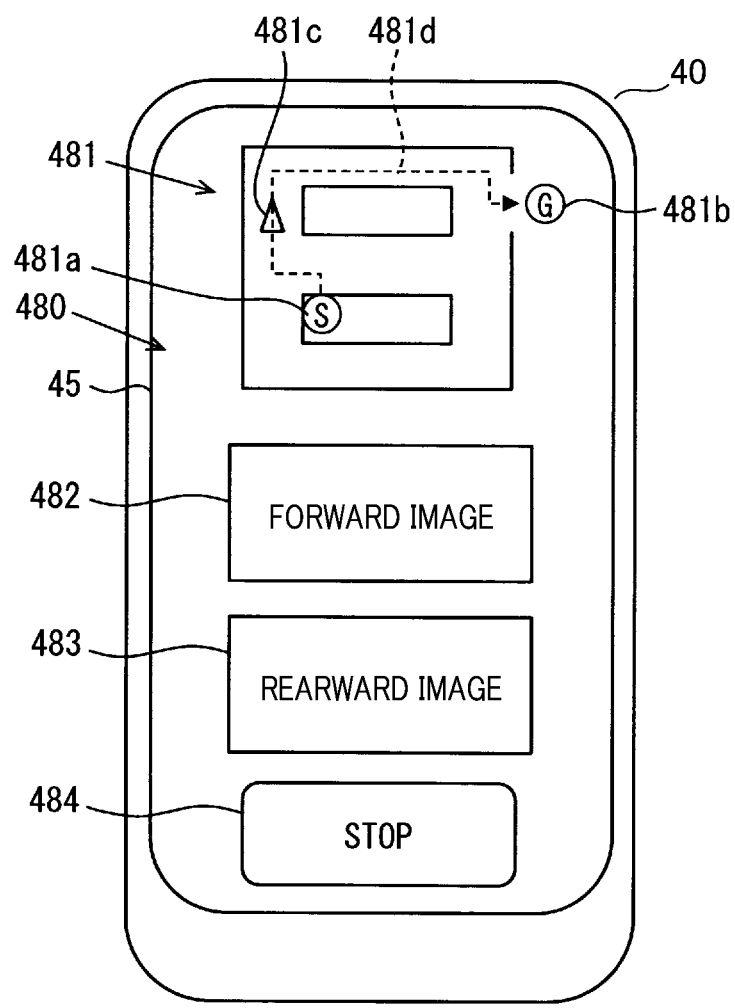
FIG. 14 is an example of a driving condition notification image displayed on a display of the smartphone in accordance with the third embodiment.

During execution of the automatic driving application 43a and upon receipt of the driving condition signal via the near field communication unit 47, the controller 48 of the smartphone 40 displays a driving condition notification image 480 as shown in FIG. 14 on the display 45. The driving condition notification image 480 includes a location notification image 481, a forward image 482, a rearward image 483, and a stop button 484.

The location notification image 481 is a map image for notifying the user 3 of the current location of the automatically driven vehicle 2, which includes a starting point marking 481a, a destination marking 481b, a current location marking 481c, and a planned route 481d. A position of the current location marking 481c in the location notification image 481 is determined based on the current location of the automatically driven vehicle 2 last detected in step S57. The starting point marking 481a represents a location of the automatically driven vehicle 2 at the start of automatic driving. The destination marking 481b represents a location of the smartphone 40. The planned route 481d represents the planned travel path 7 determined by performing the process of FIG. 9.

The forward image 482 is the latest forward image captured by the front-facing camera 102. The rearward image 483 is the latest rearward image captured by the rear-facing camera 103. The stop button 484 is a button operated by the user 3 to stop the automatically driven vehicle 2.

Advantages

During automatic driving, the driving condition notification image 480 as shown in FIG. 14 is displayed on the display 45 of the smartphone 40. Looking at the driving condition notification image 480, the user 3 can know the location of the automatically driven vehicle 2 and surroundings of the automatically driven vehicle 2 until the automatically driven vehicle 2 reaches the location of the user 3. If, looking at the forward image 482 and the rearward image 483, the user 3 determines that the automatically driven vehicle 2 should be stopped, the user 3 may operate the stop button 484 to stop the automatically driven vehicle 2.

Fourth Embodiment

A fourth embodiment will now be explained with reference to FIG. 15. In the present embodiment, in step S57 of FIG. 13, a driving condition signal that, instead of the surroundings images, includes an object position detected by the surroundings monitoring sensors is transmitted.

Figure 15:
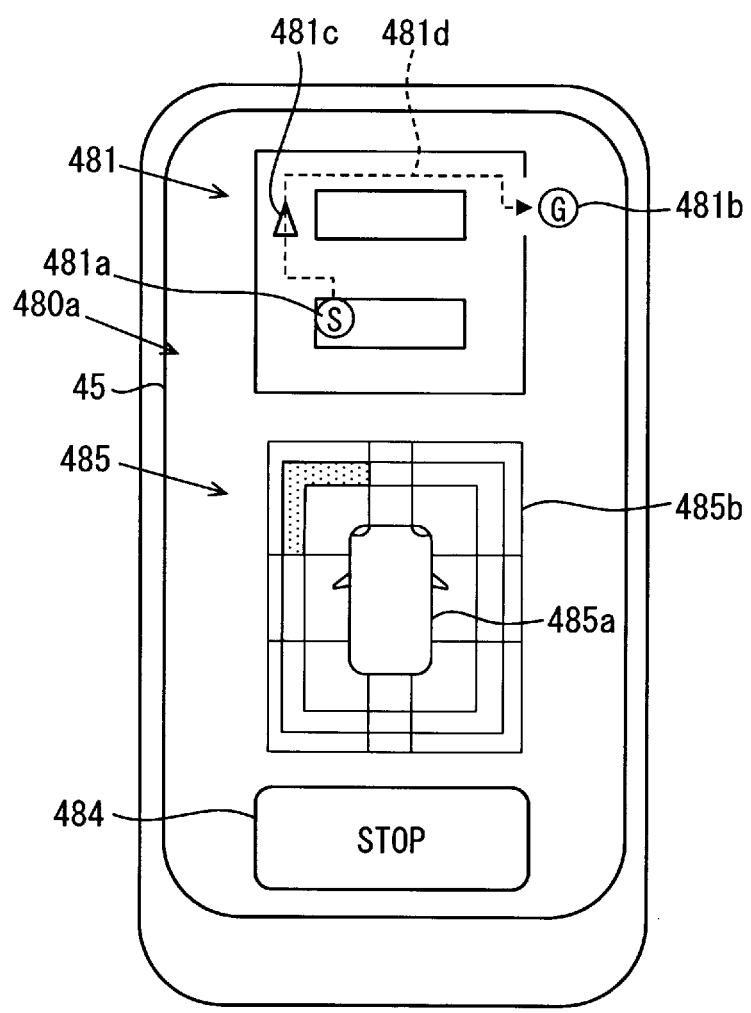
FIG. 15 is an example of a driving condition notification image displayed on a display of the smartphone in accordance with a fourth embodiment.

During execution of the automatic driving application 43a and upon receipt of the driving condition signal, the smartphone 40 displays a driving condition notification image 480a as shown in FIG. 15 on the display 45.

The driving condition notification image 480a includes the location notification image 481 and the stop button 484 that are the same as those included in the driving condition notification image 480 of the third embodiment. The driving condition notification image 480a includes an object position notification image 485 instead of the forward image 482 and the rearward image 483.

The object position notification image 485 is an image in which a plurality of location notification blocks 485b are formed around a profile 485a of the automatically driven vehicle 2. A location notification block 485b corresponding to the object position included in the driving condition signal is different in color from another location notification block 485b in which there is no object.

In the fourth embodiment, the driving condition notification image 480a as shown in FIG. 15 is displayed on the display 45 of the smartphone 40. Therefore, if, looking at the position notification image 485, the user 3 determines that the automatically driven vehicle 2 has to be stopped, the user 3 can stop the automatically driven vehicle 2 by operating the stop button 484.

Fifth Embodiment

Figure 16:
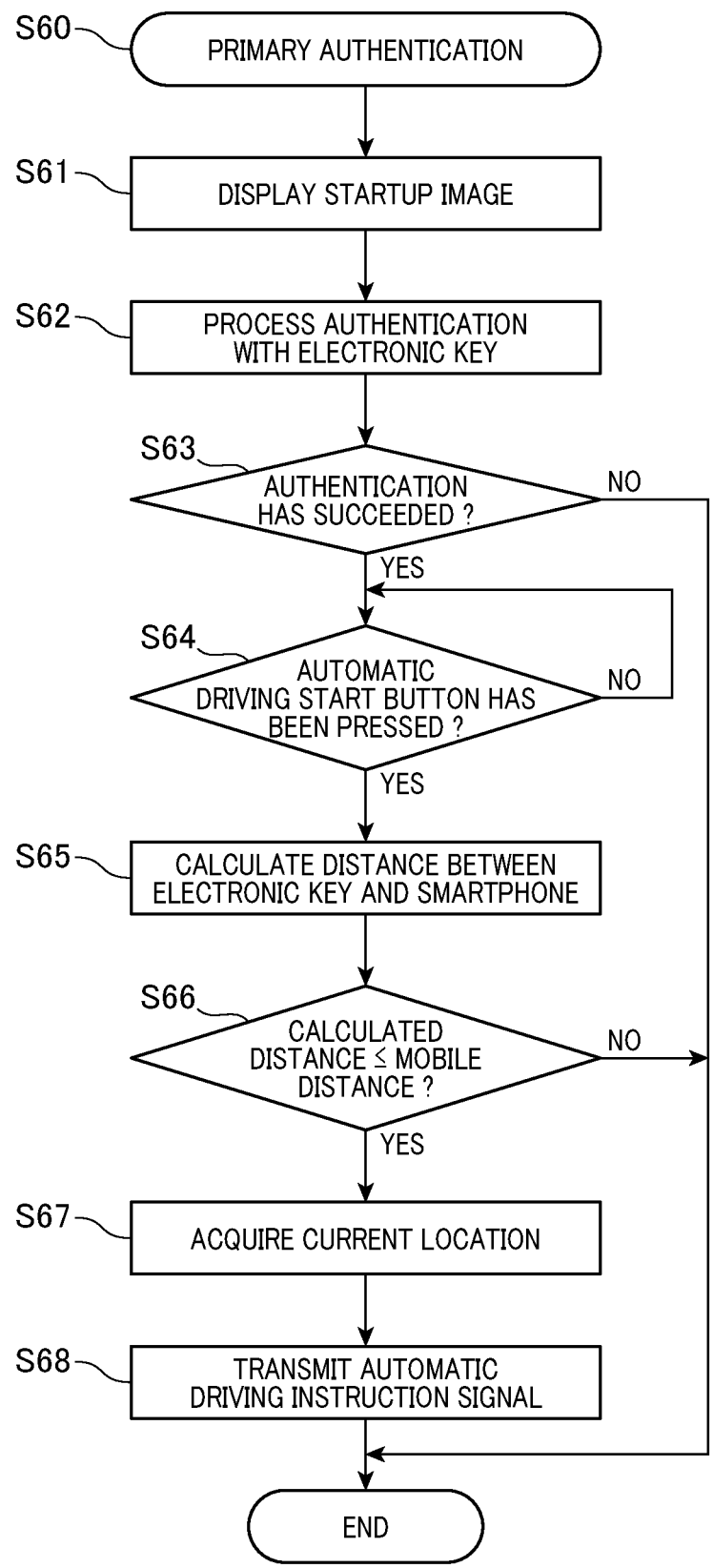
FIG. 16 is a flowchart of a process performed in the controller of the smartphone in accordance with a fifth embodiment.

A fifth embodiment of the present invention will now be explained with reference to FIG. 16. In the present embodiment, the controller 48 of the smartphone 40 performs a primary authentication process in step S60 shown in FIG. 16 as an alternative to the process of FIG. 12 performed by the controller 38 of the electronic key 30 as described regarding the second embodiment, The process of FIG. 16 is initiated when an automatic driving application 43*a* is launched. The controller 48 of the smartphone 40 includes a primary authentication unit 48*a* responsible for execution of step S60.

In step S61, a startup image is displayed on the display 45. At least an automatic driving start button for indicating start of automatic driving is displayed in the startup image.

In step S62, authentication is performed by communicating with the electronic key 30, where it is determined whether or not the smartphone 40 and the electronic key 30 have been pre-registered with each other.

In step S63, it is determined whether or not the authentication has succeeded. If it is determined that the authentication has failed, the process of FIG. 16 ends. If it is determined that the authentication has succeeded, then the process proceeds to step S64.

In step S64, it is determined whether or not the automatic driving start button displayed on the display 45 has been operated. If it is determined that the automatic driving start button displayed on the display 45 has not been operated, then step S64 is repeated. Although not shown in FIG. 16, in the event that the automatic driving application 43*a* is terminated by the user 3 while step S64 is repeatedly performed, the process of FIG. 16 ends. If it is determined that the automatic driving start button displayed on the display 45 has been operated, then the process proceeds to step S65.

In step S65, a distance between the electronic key 30 and the smartphone 40 is calculated. For example, the distance between the electronic key 30 and the smartphone 40 may be calculated based on the strength of a radio wave transmitted by the near field communication unit 47 of the smartphone 40 and then received by the near field communication unit 33 of the electronic key 30. Alternatively, the distance between the electronic key 30 and the smartphone 40 may be calculated from the current locations detected by the GNSS receivers 34, 41 of the electronic key 30 and the smartphone 40.

In step S66, it is determined whether or not the distance calculated in step S65 is equal to or less than the mobile distance. The mobile distance is the same as those defined in step S45 of FIG. 12. Alternatively, the determination in step S66 may be made by using the radio wave strength as in step S45 of FIG. 12. If in step S66 it is determined that the distance between the electronic key 30 and the smartphone 40 is greater than the mobile distance, then the process ends. If in step S66 it is determined that the distance between the electronic key 30 and the smartphone 40 is equal to or less than the mobile distance, then the process of FIG. 16 proceeds to step S67.

In step S67, a current location of the smartphone 40 is acquired from the GNSS receiver 41. Alternatively, the current location may be acquired from the GNSS receiver 34 of the electronic key 30.

In step S68, an automatic driving instruction signal including the current location acquired in step S67 is transmitted to the vehicle-mounted system 100. The automatic driving instruction signal is allowed to be transmitted only if in step S63 it is determined that the authentication has succeeded. Therefore, the automatic driving instruction signal necessarily includes a code for vehicle-mounted system 100 to authenticate the smartphone 40. Preferably, to improve the security, the automatic driving instruction signal to be transmitted to the vehicle-mounted system 100 may include the code for vehicle-mounted system 100 to authenticate the smartphone 40.

When the vehicle-mounted system 100 receives the automatic driving instruction signal from the smartphone 40, YES is determined in step 11 of FIG. 8. Then, authentication is processed in step S12. In the present embodiment, the authentication unit 131, as a secondary authentication unit, is responsible for execution of step S12 of FIG. 8.

Advantages

In the present embodiment, the automatic driving instruction signal is transmitted from the smartphone 40, which can enhance convenience for the user 3. Particularly, when combined with the embodiment where the driving condition notification image 480 of FIG. 14 or the driving condition notification image 480*a* of FIG. 15 is displayed on the display 45 of the smartphone 40, the user 3 is allowed to use the same smartphone 40 for performing the operation to start automatic driving and monitoring the automatically driven vehicle 2 during automatic driving.

In addition, the automatic driving start operation on the smartphone 40 can be performed only if the authentication with the electronic key 30 has succeeded, thereby providing higher security.

Sixth Embodiment

Figure 17:
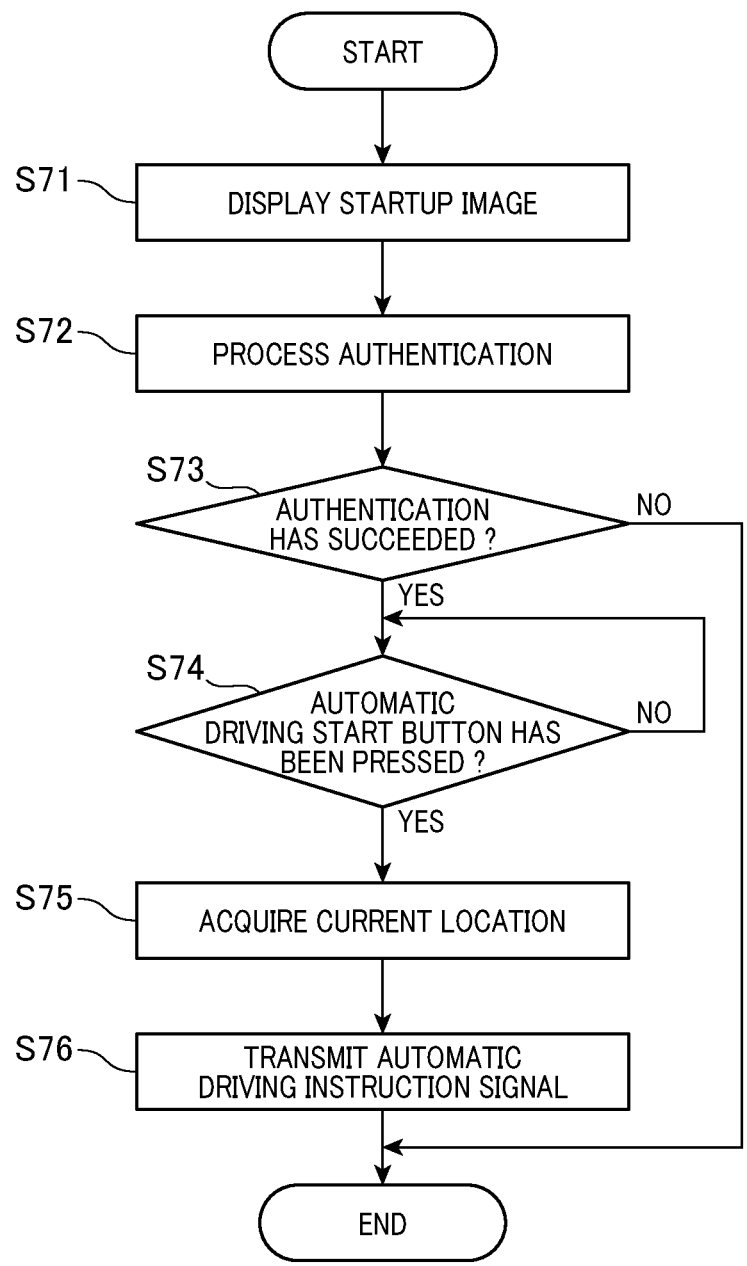
FIG. 17 is a flowchart of a process performed in the controller of the smartphone in accordance with a sixth embodiment.

A sixth embodiment will now be explained with reference to FIG. 17. In the present embodiment, the controller 48 of the smartphone 40 performs a process of FIG. 17 as an alternative to the process of FIG. 16. The process of FIG. 17 is initiated when the automatic driving application 43*a* is launched.

In step S71, as in step S61 of FIG. 16, a startup image is displayed on the display 45. As described above, an automatic driving start button for indicating start of automatic driving is displayed in the startup image.

In step S72, authentication, such as biometric authentication or password-based authentication, is processed, where the electronic key 30 is not used in the authentication in step S72. In step S73, it is determined whether or not the authentication has succeeded. If it is determined that the authentication has failed, the process of FIG. 17 ends. If it is determined that the authentication has succeeded, then the process proceeds to step S74.

In step S74, it is determined whether or not the automatic driving start button displayed on the display 45 has been operated. If it is determined that the automatic driving start button displayed on the display 45 has not been operated, then step S74 is repeated. As in the fifth embodiment, in the event that the automatic driving application 43*a* is terminated by the user 3 while step S14 is repeatedly performed, the process of FIG. 17 ends. If in step S74 it is determined that the automatic driving start button displayed on the display 45 has been operated, then the process proceeds to step S75.

In step S75, a current location of the smartphone 40 is acquired from the GNSS receiver 41 or from the GNSS receiver 34 of the electronic key 30. In step S76, an automatic driving instruction signal including the current location acquired in step S75 is transmitted to the vehicle-mounted system 100. As in the fifth embodiment, the automatic driving instruction signal may include a code used by the vehicle-mounted system 100 to authenticate the smartphone 40.

In the present embodiment, the automatic driving instruction signal is allowed to be transmitted without using the electronic key 30, which can enhance the convenience for the user 3.

Seventh Embodiment

Figure 18:
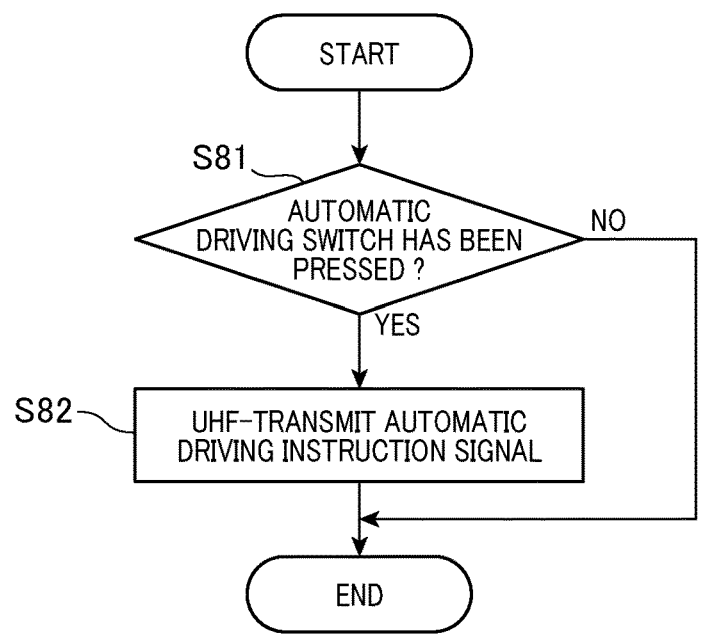
FIG. 18 is a flowchart of a process performed in the controller of the electronic key in accordance with a seventh embodiment.

A seventh embodiment of the present invention will now be explained. In the present embodiment, the controller 38 of the electronic key 30 performs a process shown in FIG. 18 as an alternative to the process of FIG. 7 or 12. In the present embodiment, the electronic key 30 serves as a primary communication device, and the smartphone 40 serves as a secondary communication device.

In step S81, it is determined whether or not the automatic driving switch 35c has been pressed. If it is determined that the automatic driving switch 35c has not been pressed, then the process of FIG. 18 ends. If it is determined that the automatic driving switch 35c has been pressed, then the process of FIG. 18 proceeds to step S82.

In step S82, an automatic driving instruction signal is transmitted from the UHF transmitter 32 of the electronic key 30. The automatic driving instruction signal includes a signal indicative of automatic driving, and further includes a code used to authenticate the electronic key 30 as included in a signal transmitted from an electronic key of a well-known electronic key system. Unlike the first embodiment, the automatic driving instruction signal does not include any current location of the electronic key 30. When the signal transmitted by the UHF transmitter 32 is the automatic driving instruction signal, the automatic driving instruction signal may have higher transmission power with a longer communication distance as compared with when the signal transmitted by the UHF transmitter 32 is a signal indicative of locking or unlocking of vehicle doors.

Figure 19:
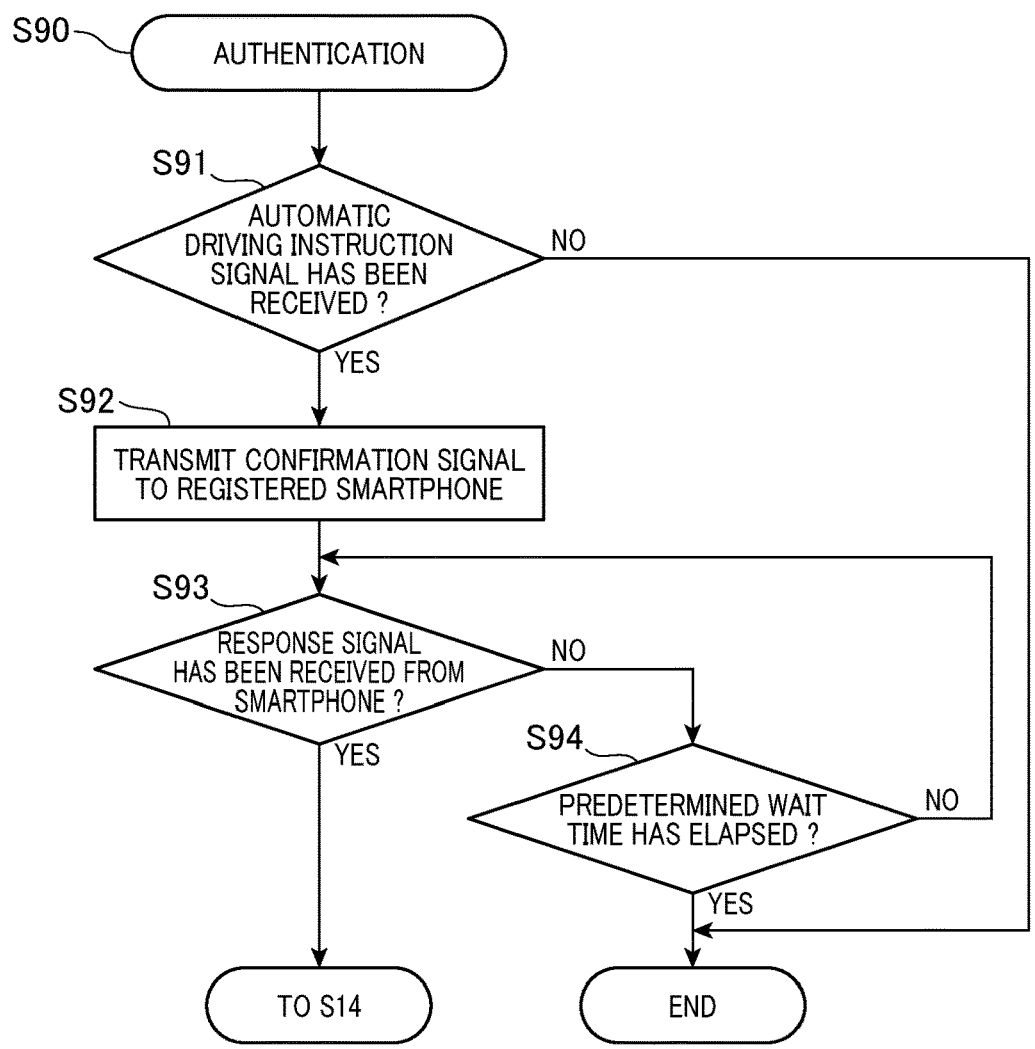
FIG. 19 is a flowchart of a process performed in the controller of the vehicle-mounted system in accordance with the seventh embodiment.

The controller 130 of the vehicle-mounted system 100 performs a process S90 shown in FIG. 19 periodically. The authentication unit 131 of the controller 130 is responsible for execution of step S90.

In step S91, it is determined whether or not the automatic driving instruction signal transmitted from the registered electronic key 30 has been received. If it is determined that the automatic driving instruction signal has not been received yet, then the process of FIG. 19 ends. If it is determined that the automatic driving instruction signal has been received, then the process proceeds to step S92.

In step S92, a confirmation signal is transmitted to the registered smartphone 40 to confirm whether or not the automatic driving instruction signal has been transmitted by a normal user 3. When the confirmation signal is received by the smartphone 40 and the start instruction button is pressed, a response signal is transmitted from the smartphone 40.

In step S93, it is determined whether or not the response signal has been received from the registered smartphone 40. If in step S93 it is determined that the response signal has been received from the registered smartphone 40, it is determined that the authentication has succeeded and the process proceeds to step S14 of FIG. 8. If in step S93 it is determined that the response signal has not been received yet, the process proceeds to step S94 of FIG. 19.

In step S94, it is determined whether or not a predetermined wait time has elapsed since the transmission of the confirmation signal. If in step S94 it is determined that the predetermined wait time has not elapsed yet since the transmission of the confirmation signal, the process returns to step S93. If in step S94 it is determined that the predetermined wait time has elapsed since the transmission of the confirmation signal, the process of FIG. 19 ends.

Figure 20:
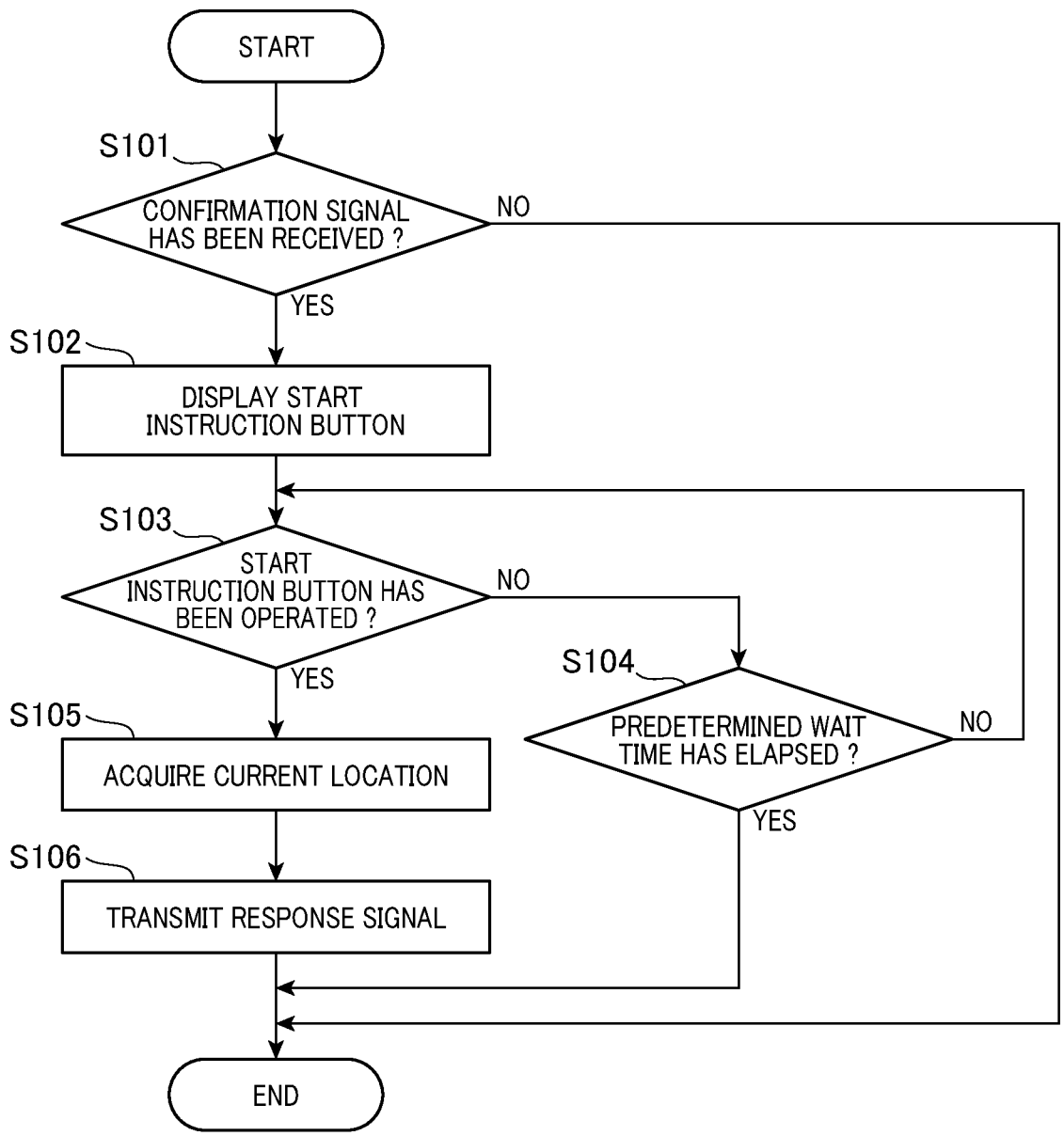
FIG. 20 is a flowchart of a process performed in the controller of the smartphone in accordance with the seventh embodiment.

The controller 48 of the smartphone 40 performs a process shown in FIG. 20 periodically while the automatic driving application 43a is activated. The automatic driving application 43a may be a resident application or a user-activated application.

In step S101, it is determined whether or not the confirmation signal transmitted from the vehicle-mounted system 100 in step S92 of FIG. 19 has been received. If in step S101 it is determined that the confirmation signal has not been received, then the process of FIG. 20 ends. If in step S101 it is determined that the confirmation signal has been received, then the process of FIG. 20 proceeds to step S102.

In step S102, a start instruction button is displayed on the display 45. In step S103, it is determined whether or not the start instruction button has been operated. If it is determined that the start instruction button has not been operated, then the process proceeds to step S104.

In step S104, it is determined whether or not a predetermined wait time has elapsed since the receipt of the confirmation signal. If it is determined that the predetermined wait time has not elapsed yet since the receipt of the confirmation signal, then the process returns to step S103. If it is determined that the predetermined wait time has elapsed since the receipt of the confirmation signal, then the process of FIG. 20 proceeds to step S105.

In step S105, a current location of the smartphone 40 is acquired from the GNSS receiver 41. In step S106, a response signal including the current location acquired in step S105 is transmitted to the vehicle-mounted system 100. When the response signal is received by the vehicle-mounted system 100, then YES is determined in step S93.

Advantages

In the seventh embodiment, the electronic key 30 is configured to transmit the automatic driving instruction signal via the UHF transmitter 32, and unlike the first embodiment, the automatic driving instruction signal does not include the current location of the electronic key 30. The UHF transmitter 32 may be included in an electronic key of a well-known electronic key system. Therefore, in the seventh embodiment, the electronic key 30 may have a small change in configuration from the electronic key of the well-known electronic key system.

In the seventh embodiment, the electronic key 30 is configured such that the automatic driving instruction signal has higher transmission power as compared with a signal indicative of locking or unlocking of vehicle doors. Therefore, in the seventh embodiment, the electronic key 30 may have a smaller change in configuration from the electronic key of the well-known electronic key system as compared with an electronic key provided with an additional communication unit operable in a different communication scheme based on a different frequency band different from the UHF band.

In addition, automatic driving can be started only when the vehicle-mounted system 100 receives the response signal transmitted by the registered smartphone 40 in response to the confirmation signal from the vehicle-mounted system 100. This can increase the security.

Modifications

It is to be understood that the invention is not to be limited to the specific embodiment disclosed above and that modifications and other embodiments are intended to be included within the scope of the appended claims.

First Modification

In addition to the conditions of FIG. 9 of first embodiment, there may be an additional condition as follows. It is determined whether or not accidents occur in the parking lot or whether or not accidents occur at a high frequency in the parking lot. Also if it is determined that accidents occur in the parking lot or accidents occur at a high frequency in the parking lot, automatic driving may be disallowed. Information to determine whether or not accidents occur in the parking lot or whether or not accidents occur at a high frequency in the parking lot may be acquired by communications. A device to transmit such information may be a communication unit or a radio, the parking lot monitor 10, or the central server 20. Detection of the accidents may be performed by a collision detector mounted in the vehicle. The detection of the accidents may be communicated from the communication unit to vehicles in the environment of the automatically driven vehicle 2, the parking lot monitor 10, and the central server 20. Termination of handling of the accidents may be communicated by the parking lot monitor 10 or the central server 20. The handling of the accident may be terminated after a certain amount of time has elapsed since the accident. A frequency at which the accidents occur may be determined based on the number of accidents which have occurred in a certain time period, and whether the frequency is high or low may be determined based on comparison of the frequency with a predetermined threshold.

Second to Twelfth Modifications

In the first embodiment, if YES is determined in all steps S21 to S27, automatic driving is allowed. Alternatively, if YES is determined in some of steps S21 to S27, automatic driving may be allowed.

More specifically, in a second modification, only steps S22, S23 may be performed. In a third modification, steps S22, S23, S24 may be performed. In a fourth modification, steps S22, S23, S26 may be performed. In a fifth modification, steps S22, S23, S24, S26 may be performed.

In a sixth modification, only step S21 may be performed. In a seventh modification, only step S25 may be performed. In an eighth modification, only step S27 may be performed. In a ninth modification, a combination of the modifications 6 to 8, that is, steps S21, S25 may be performed. In a tenth modification, steps S21, S27 may be performed. In an eleventh modification, steps S21, S25, S27 may be performed.

In a twelfth modification, one of the modifications 1 to 5 may be combined with one of the sixth to eleventh modifications.

Thirteenth Modification

In the case where the automatically driven vehicle 2 is located in the parking lot and a width of each passway in the parking lot is greater than two vehicle widths (where two vehicles can travel in the opposite directions in the pathway), automatic driving may be allowed without making the determinations in the process of FIG. 9.

Fourteenth Modification

Under an assumption that all the conditions in each of the modifications 6 to 11 are met, based on the determination of whether or not a width of each passway in the parking lot where the automatically driven vehicle 2 is parked is greater than two vehicle widths, it may be determined whether or not automatic driving is allowed.

Fifteenth Modification

In each of the third and fourth embodiments, during automatic driving, the vehicle-mounted system 100 establishes the communication with the smartphone 40 and then sequentially transmits the driving condition signal to the smartphone 40. If the communication is interrupted, the controller 130 of the vehicle-mounted system 100 may halt automatic driving. When automatic driving is halted, the automatically driven vehicle 2 is stopped. Preferably, in the fifteenth embodiment, if the communication with the vehicle-mounted system 100 is interrupted during automatic driving, the smartphone 40 may display on the display 45 an indication that automatic driving has been halted.

Sixteenth Modification

In step S35 of FIG. 11, it may be determined whether or not a moving object is present within the predetermined distance, where the moving object may be a person or any other type of moving object. If it is determined that a moving object is present within the predetermined distance, an alert operation as a function of the type of the moving object may be performed for making the moving object pay its attention to the automatically driven vehicle 2. As an example, each moving object may be classified into an adult or a child. The alert operation may include lamp blinking, sounding an alert, changing a speed, or a combination of these. The alert operation may be changed as a function of a distance between the moving object and the automatically driven vehicle 2 or an amount of time that has elapsed since initiation of the alert operation. For example, the alert operation may start with lamp flickering alone, and then an alert is additionally sounded.

Seventeenth Modification

The electronic key 30 and the smartphone 40 may be each provided with an infrared communication unit and/or a near field communication unit for communicating with each other.

Eighteenth Modification

In each of the first to seventh embodiments, the smartphone 40 and the vehicle-mounted system 100 communicate directly with each other, and the electronic key 30 and the vehicle-mounted system 100 communicate directly with each other. Alternatively, the smartphone 40 and the vehicle-mounted system 100 may communicate indirectly with each other via the central server 20 or the parking lot monitor 10. The electronic key 30 and the vehicle-mounted system 100 may communicate indirectly with each other via the parking lot monitor 10 or the smartphone 40.

Nineteenth to Twenty-First Modifications

In a nineteenth modification as a modification to the first or second embodiment, instead of the electronic key 30, the smartphone 40 may be used. In a twentieth modification as a modification to the fifth embodiment, the primary authentication S60 may be performed by the electronic key 30. A flowchart for step S60 of this modification is substantially the same as the flowchart of FIG. 12.

In a twenty-first modification as a modification to the seventh embodiment, the processes performed by the electronic key 30 and the smartphone 40 may be exchanged. In the twentieth and twenty-first modifications, the near field communication unit 47 may serve as a receiver on the mobile device, the display 45 may serve as a display. In the twenty-first modification, the smartphone 40 may serve as a primary communication device, and the electronic key 30 may serve as a secondary communication device.

What is claimed is:

1. An automatic driving system for an automatically driven vehicle, comprising:
   a central processing unit (CPU);
   a memory;
   one or more integrated circuits;
   a travel direction acquirer, using the CPU and the one or more integrated circuits, configured to acquire travel direction information that is information indicative of whether or not each roadway in a parking lot is unidirectional; and
   an allowance determination unit, using the CPU and the one or more integrated circuits, configured to, in response to determining, based on the travel direction information acquired by the travel direction acquirer, that each roadway in the parking lot is unidirectional, allow automatic driving of the automatically driven vehicle, and in response to determining, based on the travel direction information, that each roadway in the parking lot is not unidirectional, disallow automatic driving of the automatically driven vehicle.

2. The system of claim 1, wherein
   the travel direction acquirer is configured to acquire, as the travel direction information, a rule for travel directions of the roadways in the parking lot and travel directions in which vehicles actually travel in the roadways in the parking lot, and
   the allowance determination unit is configured to, in response to determining, based on the rule for the travel directions included in the travel direction information, that each of the roadways in the parking lot is unidirectional, and in response to determining, based on the travel directions in which the vehicles actually travel included in the travel direction information, that the travel directions in which the vehicles actually travel in the roadways in the parking lot coincide with the travel directions of the roadways in the parking lot defined by the rule, allow automatic driving of an automatically driven vehicle.

3. The system of claim 1, further comprising an empty bay value acquirer configured to acquire an empty bay value that is a number of empty bays in the parking lot or a ratio of the number of empty bays to a total number of bays in the parking lot,
   wherein the allowance determination unit is configured to, in response to the empty bay value being less than a predetermined allowable reference value, disallow automatic driving of the automatically driven vehicle.

4. The system of claim 1, further comprising a mobile device carried by a user of the automatically driven vehicle, the mobile device being configured to transmit an automatic driving instruction signal for instructing the automatically driven vehicle to start automatic driving,
   wherein the mobile device is configured to include a location of the mobile device in the automatic driving instruction signal, and transmit the automatic driving instruction signal including the location of the mobile device, and
   the allowance determination unit is configured to, in response to determining, based on the travel direction information acquired by travel direction acquirer, that each roadway in the parking lot is unidirectional, and in response to a travel path for the automatically driven vehicle to reach a location of the user being successfully set up, allow automatic driving of the automatically driven vehicle in the parking lot.

5. The system of claim 1, wherein the allowance determination unit is configured to, in response to the parking lot being outdoors and the weather in the parking lot being rainy, foggy or snowy, disallow automatic driving.

6. The system of claim 1, further comprising a mobile device carried by a user of the automatically driven vehicle, the mobile device being configured to transmit an automatic driving instruction signal for instructing the automatically driven vehicle to start automatic driving, wherein the mobile device is configured to include a location of the mobile device in the automatic driving instruction signal, and transmit the automatic driving instruction signal including the location of the mobile device;
   a vehicle location detector mounted in the automatically driven vehicle, the vehicle location detector being configured to detect a location of the automatically driven vehicle; and
   a distance determiner configured to, based on the location of the mobile device included in the automatic driving instruction signal transmitted by the mobile device and the location of the automatically driven vehicle detected by the vehicle location detector, determine a distance between the mobile device and the automatically driven vehicle,
   wherein the allowance determination unit is configured to, in response to the distance between the mobile device and the automatically driven vehicle determined by the distance determiner being greater than a predetermined allowable distance threshold, disallow automatic driving of the automatically driven vehicle.

7. The system of claim 1, further comprising:
   a mobile device carried by a user of the automatically driven vehicle, the mobile device being configured to transmit an automatic driving instruction signal for instructing the automatically driven vehicle to start automatic driving; and
   a transmitter mounted in the automatically driven vehicle, the transmitter being configured to, in response to the allowance determination unit determining to disallow automatic driving of the automatically driven vehicle, transmit a disallowance signal indicative of automatic driving of the automatically driven vehicle being disallowed,
   wherein the mobile device comprises:
   a receiver configured to receive the disallowance signal; and
   a display configured to, in response to receipt of the disallowance signal at the receiver, display that automatic driving of the automatically driven vehicle has been disallowed.

8. The system of claim 1, further comprising:
   an electronic key pre-registered as a device via which the automatically driven vehicle can be remote-operated;
   a mobile communication device pre-registered as a device that belongs to a user of the automatically driven vehicle; and an authentication unit configured to authenticate the electronic key and the mobile communication device, wherein the allowance determination unit is configured to, in response to, as an additional condition for allowing automatic driving of the automatically driven vehicle, the authentication of the electronic key and the mobile communication device by the authentication unit having succeeded, allow automatic driving of the automatically driven vehicle.

9. The system of claim 8, wherein the authentication unit comprises:
a primary authentication unit configured to, in response to determining that a distance between the electronic key and the mobile communication device is equal to or less than a mobile distance defined such that, in response to the distance between the electronic key and the smartphone being equal to or less than the mobile distance, it can be assumed that both the electronic key and the smartphone are communicable with each other and carried by the user, determine that the electronic key and the mobile communication device are pre-registered with each other; and
a secondary authentication unit mounted in the automatically driven vehicle, the secondary authentication unit being configured to, in response to receipt of a signal indicating that the authentication processed in the primary authentication unit has succeeded from either one of the electronic key and the mobile communication device, determine that authentication of the electronic key and the mobile communication device has succeeded.

10. The system of claim 8, wherein
a primary communication device that is one of the electronic key and the mobile communication device comprises a transmitter configured to transmit an automatic driving instruction signal including a signal indicative of the primary communication device being pre-registered with the system, and
the authentication unit is configured to, in response to receipt of the automatic driving instruction signal at a receiver mounted in the automatically driven vehicle, transmit a confirmation signal to a secondary communication device that is the other of the electronic key and the mobile communication device, and in response to the receiver having received a response signal transmitted from the secondary communication device in response to the confirmation signal, determine that authentication of the electronic key and the mobile communication device has succeeded.

11. The system of claim 1, further comprising a warning unit configured to sound an alert prior to the automatically driven vehicle starting to move to ensure that persons around the automatically driven vehicle in the parking lot are aware that automatic driving is started.

12. The system of claim 1, further comprising:
a mobile device carried by a user of the automatically driven vehicle, the mobile device being configured to transmit an automatic driving instruction signal for instructing the automatically driven vehicle to start automatic driving; and
an automatic-driving controller configured to, during automatic driving of the automatically driven vehicle, sequentially determine whether or not the communication with the mobile device is interrupted, and in response to determining that the communication with the mobile device is interrupted, stop automatic driving of the automatically driven vehicle.

13. A method for operating an automatic driving system for an automatically driven vehicle, the method comprising:
acquiring travel direction information that comprises information indicative of whether or not each roadway in a parking lot is unidirectional;
determining, based on the acquired travel direction information, whether each roadway in the parking lot is unidirectional;
allowing automatic driving of the automatically driven vehicle in response to determining that each roadway in the parking lot is unidirectional; and
disallowing automatic driving of the automatically driven vehicle in response to determining that each roadway in the parking lot is not unidirectional.

14. The method of claim 13 further comprising:
acquiring travel direction information comprising a rule for travel directions of the roadways in the parking lot and travel directions in which vehicles actually travel in the roadways in the parking lot;
determining, based on the rule for the travel directions included in the travel direction information, whether each of the roadways in the parking lot is unidirectional;
determining, based on the travel directions in which the vehicles actually travel included in the travel direction information, whether the travel directions in which the vehicles actually travel in the roadways in the parking lot coincide with the travel directions of the roadways in the parking lot defined by the rule; and
allowing automatic driving of an automatically driven vehicle in response to determining that each of the roadways in the parking lot is unidirectional and the travel directions in which the vehicles actually travel in the roadways in the parking lot coincide with the travel directions of the roadways in the parking lot define by the rule.

15. The method of claim 13, further comprising:
acquiring an empty bay value that is a number of empty bays in the parking lot or a ratio of the number of empty bays to a total number of bays in the parking lot; and
in response to the empty bay value being less than a predetermined allowable reference value, disallowing automatic driving of the automatically driven vehicle.

16. The method of claim 13, further comprising:
transmitting, via a mobile device of the user, an automatic driving instruction signal for instructing the automatically driven vehicle to start automatic driving, wherein the mobile device is configured to include a location of the mobile device in the automatic driving instruction signal, and transmit the automatic driving instruction signal including the location of the mobile device; and
in response to determining, based on the travel direction information, that each roadway in the parking lot is unidirectional, and in response to a travel path for the automatically driven vehicle to reach a location of the user being successfully set up, allowing automatic driving of the automatically driven vehicle in the parking lot.

17. A non-transitory computer readable medium comprising code, which when executed by a processor, causes the processor to perform a method comprising:
acquiring travel direction information that comprises information indicative of whether or not each roadway in a parking lot is unidirectional;
determining, based on the acquired travel direction information, whether each roadway in the parking lot is unidirectional;

allowing automatic driving of the automatically driven vehicle in response to each roadway in the parking lot being unidirectional; and disallowing automatic driving of the automatically driven vehicle in response to determining that each roadway in the parking lot is not unidirectional.

18. The non-transitory computer readable medium of claim 17, wherein the method further comprises:

acquiring travel direction information comprising a rule for travel directions of the roadways in the parking lot and travel directions in which vehicles actually travel in the roadways in the parking lot;

determining, based on the rule for the travel directions included in the travel direction information, whether each of the roadways in the parking lot is unidirectional;

determining, based on the travel directions in which the vehicles actually travel included in the travel direction information, whether the travel directions in which the vehicles actually travel in the roadways in the parking lot coincide with the travel directions of the roadways in the parking lot defined by the rule; and allowing automatic driving of an automatically driven vehicle in response to determining that each of the roadways in the parking lot is unidirectional and the travel directions in which the vehicles actually travel in the roadways in the parking lot coincide with the travel directions of the roadways in the parking lot define by the rule.

19. The non-transitory computer readable medium of claim 17, wherein the method further comprises:

acquiring an empty bay value that is a number of empty bays in the parking lot or a ratio of the number of empty bays to a total number of bays in the parking lot; and in response to the empty bay value being less than a predetermined allowable reference value, disallowing automatic driving of the automatically driven vehicle.

20. The non-transitory computer readable medium of claim 17, wherein the method further comprises:

transmitting, via a mobile device of the user, an automatic driving instruction signal for instructing the automatically driven vehicle to start automatic driving, wherein the mobile device is configured to include a location of the mobile device in the automatic driving instruction signal, and transmit the automatic driving instruction signal including the location of the mobile device; and in response to determining, based on the travel direction information, that each roadway in the parking lot is unidirectional, and in response to a travel path for the automatically driven vehicle to reach a location of the user being successfully set up, allowing automatic driving of the automatically driven vehicle in the parking lot.

\* \* \* \* \*